United States Patent
Im et al.

(10) Patent No.: US 11,613,917 B2
(45) Date of Patent: Mar. 28, 2023

(54) DEVICE FOR OPENING AND CLOSING TAILGATE

(71) Applicants: HYUNDAI MOTOR COMPANY, Seoul (KR); KIA MOTORS CORPORATION, Seoul (KR)

(72) Inventors: Yong Hyuck Im, Seoul (KR); Sang Min Jeong, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 186 days.

(21) Appl. No.: 17/181,759

(22) Filed: Feb. 22, 2021

(65) Prior Publication Data

US 2022/0034129 A1 Feb. 3, 2022

(30) Foreign Application Priority Data

Jul. 30, 2020 (KR) .................. 10-2020-0095152

(51) Int. Cl.
*E05B 81/56* (2014.01)
*E05B 85/24* (2014.01)
(Continued)

(52) U.S. Cl.
CPC ............ *E05B 81/56* (2013.01); *B62D 33/037* (2013.01); *E05B 81/14* (2013.01); *E05B 81/20* (2013.01);
(Continued)

(58) Field of Classification Search
CPC .......... E05B 81/06; E05B 81/14; E05B 81/18; E05B 81/20; E05B 81/34; E05B 81/36; E05B 81/64; E05B 81/66; E05B 81/68
See application file for complete search history.

(56) References Cited

U.S. PATENT DOCUMENTS 6,557,910 B2 * 5/2003 Amano ............... E05B 81/20
  292/216
7,032,937 B2 * 4/2006 Boecker ............. E05B 81/20
  292/201
(Continued)

FOREIGN PATENT DOCUMENTS

CN 108930464 A * 12/2018 ............ E05B 81/06
CN 109519062 A * 3/2019 ............ E05B 81/06
(Continued)

OTHER PUBLICATIONS

English Translation for CN 108930464 A (Year: 2018).*

*Primary Examiner* — Alyson M Merlino
(74) *Attorney, Agent, or Firm* — McDonnell Boehnen Hulbert & Berghoff LLP

(57) ABSTRACT

A tailgate opening/closing device has a simplified tailgate opening/closing structure, reduced manufacturing cost, reduced weight, and improved quality. The device includes a release gear configured to be rotated forwards and backwards by a rotational force from a motor, a cinching gear engaged with the release gear, a linkage mechanism configured to receive force from the cinching gear to rotate toward a claw, the claw being caught by the linkage mechanism to rotate together therewith so as to be engaged with a striker, and a pawl unit configured to be caught by the claw in the state in which the claw is engaged with the striker so as to restrict rotation of the claw and configured to allow rotation of the claw in a release operation direction only when the release gear rotates in the release operation direction.

17 Claims, 20 Drawing Sheets

(51) Int. Cl.
  *E05B 85/26* (2014.01)
  *E05B 81/14* (2014.01)
  *E05B 81/20* (2014.01)
  *E05B 81/34* (2014.01)
  *E05B 81/68* (2014.01)
  *E05B 83/18* (2014.01)
  *B62D 33/037* (2006.01)
  *E05B 81/72* (2014.01)
  *E05B 81/66* (2014.01)
  *E05B 83/26* (2014.01)

(52) U.S. Cl.
  CPC .............. *E05B 81/34* (2013.01); *E05B 81/66* (2013.01); *E05B 81/68* (2013.01); *E05B 81/72* (2013.01); *E05B 83/18* (2013.01); *E05B 85/243* (2013.01); *E05B 85/26* (2013.01); *E05B 83/26* (2013.01)

(56) References Cited

U.S. PATENT DOCUMENTS

| | | | | |
|---|---|---|---|---|
| 7,059,640 | B2* | 6/2006 | Tensing | E05B 81/14 |
| | | | | 292/216 |
| 9,290,969 | B2* | 3/2016 | Yokota | E05B 81/20 |
| 9,487,973 | B2* | 11/2016 | Yokota | E05B 81/20 |
| 10,808,433 | B2* | 10/2020 | Im | E05B 81/34 |
| 2018/0073284 | A1* | 3/2018 | Im | E05B 83/18 |
| 2018/0171677 | A1* | 6/2018 | Im | E05B 83/18 |
| 2020/0318400 | A1* | 10/2020 | Johann | E05B 81/14 |

FOREIGN PATENT DOCUMENTS

| | | | | |
|---|---|---|---|---|
| CN | 109610956 | A * | 4/2019 | ............ E05B 81/20 |
| CN | 110259294 | A * | 9/2019 | |
| KR | 2016-0115569 | A | 10/2016 | |

\* cited by examiner

DEVICE FOR OPENING AND CLOSING TAILGATE

CROSS REFERENCE TO RELATED APPLICATIONS

This application claims priority from Korean Patent Application No. 10-2020-0095152, filed on Jul. 30, 2020, in the Korean Intellectual Property Office, the disclosure of which is incorporated herein by reference in its entirety.

BACKGROUND

1. Field

The present disclosure relates to a tailgate opening/closing device having a simplified tailgate opening/closing structure, reduced manufacturing cost, reduced weight, and improved quality.

2. Description of the Related Art

In general, a sports utility vehicle (SUV) or a multi-purpose vehicle (MPV) has an opening formed in the rear portion thereof so that a user easily loads articles into the vehicle and a tailgate for opening and closing the opening.

For example, a claw is mounted to the tailgate, and a striker is mounted to the vehicle body. When the tailgate is closed, the tailgate is locked such that the claw is engaged with the striker. When a release lever is operated, the tailgate is unlocked such that the claw is disengaged from the striker.

In particular, in the case of a power tailgate device that is locked and unlocked by a claw and a striker, which are electrically driven, a cinching motor for performing a locking operation and a release motor for performing an unlocking operation are additionally mounted to perform corresponding functions.

For example, the cinching motor is connected to the claw device via a separate cable, and the release motor is mounted to the claw device.

In the state in which the claw is half engaged with the striker, when the cinching motor is operated to completely close the tailgate, the cable is pulled by the cinching motor, and the claw is completely engaged with the striker.

In this state, when the release motor is operated to open the tailgate, the claw is released from the striker by the release motor and moves to a position at which the claw allows full opening of the tailgate, whereby the tailgate is opened.

However, in such a power tailgate device, the cinching motor and the release motor are mounted separately from each other, thus leading to an increase in the manufacturing cost and the weight of the device. In addition, since the number of components is high, the defect rate of the device increases.

The information disclosed in this Background section is only for enhancement of understanding of the general background of the disclosure and should not be taken as an acknowledgement or any form of suggestion that this information forms the related art already known to a person skilled in the art.

SUMMARY

Therefore, the present disclosure has been made in view of the above problems, and it is an object of the present disclosure to provide a tailgate opening/closing device having a simplified tailgate opening/closing structure, reduced manufacturing cost, reduced weight, and improved quality.

In accordance with the present disclosure, the above and other objects can be accomplished by a device for opening and closing a tailgate, the device including a release gear configured to be rotated forwards and backwards by a rotational force transmitted thereto from a motor in order to perform a cinching operation and a release operation, a cinching gear engaged with the release gear and configured to rotate, a linkage mechanism configured to receive force from the cinching gear to rotate toward a claw when the cinching gear rotates for the cinching operation, the claw being caught by the linkage mechanism rotating for the cinching operation to rotate together therewith so as to be engaged with a striker, and a pawl unit configured to be caught by the claw in the state in which the claw is engaged with the striker so as to restrict rotation of the claw in a release operation direction and configured to rotate together with the release gear only when the release gear rotates in the release operation direction so as to allow rotation of the claw in the release operation direction.

A hook recess may be formed in the outer surface of the claw that faces the striker. When the striker is introduced into the hook recess, the claw may be rotated about a rotary shaft thereof such that the claw is half-locked to the striker.

The device may further include a half-lock detection sensor configured to detect a half-locked position of the claw and a controller configured to control the motor to rotate in a cinching operation direction when the half-locked position is detected.

A half-lock detection protrusion may be formed on the circumference of the rotary shaft of the claw, and the half-lock detection sensor may detect a half-locked state depending on whether the half-lock detection protrusion is detected.

A first restricting protrusion may be formed on the outer surface of the claw so as to protrude toward the pawl unit, and a locking protrusion may be formed on the outer surface of the pawl unit so as to protrude toward the claw. In the half-locked state of the claw, the locking protrusion may be caught by the first restricting protrusion, thereby restricting rotation of the claw in the release operation direction.

A cinching protrusion may be formed on a portion of the cinching gear in a circumferential direction of the cinching gear. A portion of the linkage mechanism may be located in the rotation path of the cinching protrusion such that the cinching protrusion applies pressing force to the linkage mechanism when rotating.

The linkage mechanism may include a crank lever having one end to which a first fixed hinge shaft is coupled, and an opposite end to which a first rotary hinge shaft is coupled, a coupler lever having one end coupled to the first rotary hinge shaft and an opposite end to which a second rotary hinge shaft is coupled, and a follower lever having one end to which a second fixed hinge shaft is coupled and an opposite end coupled to the second rotary hinge shaft. When the outer surface of the crank lever is pressed by the cinching protrusion, the levers may be rotated such that the first rotary hinge shaft and the second rotary hinge shaft are rotated about the first fixed hinge shaft and the second fixed hinge shaft.

The device may further include a cinching lever having one end coupled to the second rotary hinge shaft and an opposite end to which a cinching shaft is secured and a cinching spring configured to apply elastic force to the cinching lever such that the cinching shaft rotates toward the claw about the second rotary hinge shaft. A latching protrusion may be formed on a portion of the outer surface of the claw. In the process in which the cinching lever rotates toward the claw, the cinching shaft may be caught by the latching protrusion, and the claw may be rotated so as to be engaged with the striker.

A release protrusion may be formed on a portion of the release gear in a circumferential direction of the release gear. The pawl unit may include a pawl disposed opposite the claw and configured to rotate about a rotary shaft thereof and a pawl lever having one end located in the rotation path of the release protrusion so as to interfere with the release protrusion and an opposite end disposed at an end portion of the pawl so as to be rotated alone when the release gear is rotated in the cinching operation direction and to be rotated together with the pawl when the release gear is rotated in the release operation direction.

The device may further include a pawl lever spring configured to apply elastic force to the pawl lever in the direction in which the pawl lever is rotated alone relative to the pawl.

A stopper may be formed between the pawl and the pawl lever. The stopper may be located in the rotation path of the pawl lever rotating together with the pawl.

The device may further include a full-lock detection sensor configured to detect a fully locked position of the claw when the claw is fully locked to the striker by the cinching operation of the motor, and a controller configured to control the motor to stop operating when the fully locked position of the claw is detected.

A full-lock detection protrusion may be formed on the circumference of a rotary shaft of the cinching gear, and the full-lock detection sensor may detect a fully locked state depending on whether the full-lock detection protrusion is detected.

A pinion may be secured to a rotary shaft of the release gear. The pinion may be externally engaged with the cinching gear at a predetermined reduction gear ratio. When the motor is rotated in the cinching operation direction and the full-lock detection protrusion rotating according to the reduction gear ratio is detected by the full-lock detection sensor, it may be determined that the operation state is the fully locked state.

A second restricting protrusion may be formed on the outer surface of the claw so as to protrude toward the pawl unit, and a locking protrusion may be formed on the outer surface of the pawl unit so as to protrude toward the claw. When the claw is located at the fully locked position, the locking protrusion may be caught by the second restricting protrusion, thereby restricting rotation of the claw in the release operation direction.

The locking protrusion may be formed on the upper end of the rotary shaft of the pawl. The device may further include a pawl spring configured to apply elastic force to the pawl so that the locking protrusion rotates toward the claw and a claw spring configured to apply elastic force to the claw in the direction in which the claw rotates to perform the release operation.

The device may further include an unlock detection sensor configured to detect an unlocked position of the pawl when the pawl lever and the pawl are rotated together by the release protrusion according to the release operation of the motor and the claw is released from the striker. The controller may control the motor to stop operating when the unlocked position is detected.

An unlock detection protrusion may be formed on the circumference of the rotary shaft of the pawl, and the unlock detection sensor may detect an unlocked state depending on whether the unlock detection protrusion is detected.

The controller may stop the motor when detecting the unlocked position of the pawl, and may control the motor to return to the state prior to the release operation when a predetermined period of time elapses after the motor is stopped.

The device may further include an interrupt lever having one end pressed by the pawl in the release operation. The interrupt lever may rotate about the middle portion thereof such that the opposite end thereof pushes up a cinching shaft so as to release the cinching shaft from a latching protrusion of the claw.

When the release gear is rotated in the release operation direction, the release protrusion may push the pawl lever and the pawl together such that the one end of the interrupt lever is pressed.

The device may further include an interrupt lever spring configured to apply elastic force to the interrupt lever such that the one end of the interrupt lever is rotated toward the pawl lever.

The device may further include an emergency lever configured to be rotated about the middle portion thereof and having one end located outside a latch mechanism and an opposite end located inside the pawl lever such that the opposite end rotates the pawl lever in the release operation direction according to rotation of the one end.

BRIEF DESCRIPTION OF THE FIGURES

The above and other objects, features and other advantages of the present disclosure will be more clearly understood from the following detailed description taken in conjunction with the accompanying drawings, in which.

DETAILED DESCRIPTION

Hereinafter, exemplary embodiments of the present disclosure will be described with reference to the accompanying drawings.

Figure 1:
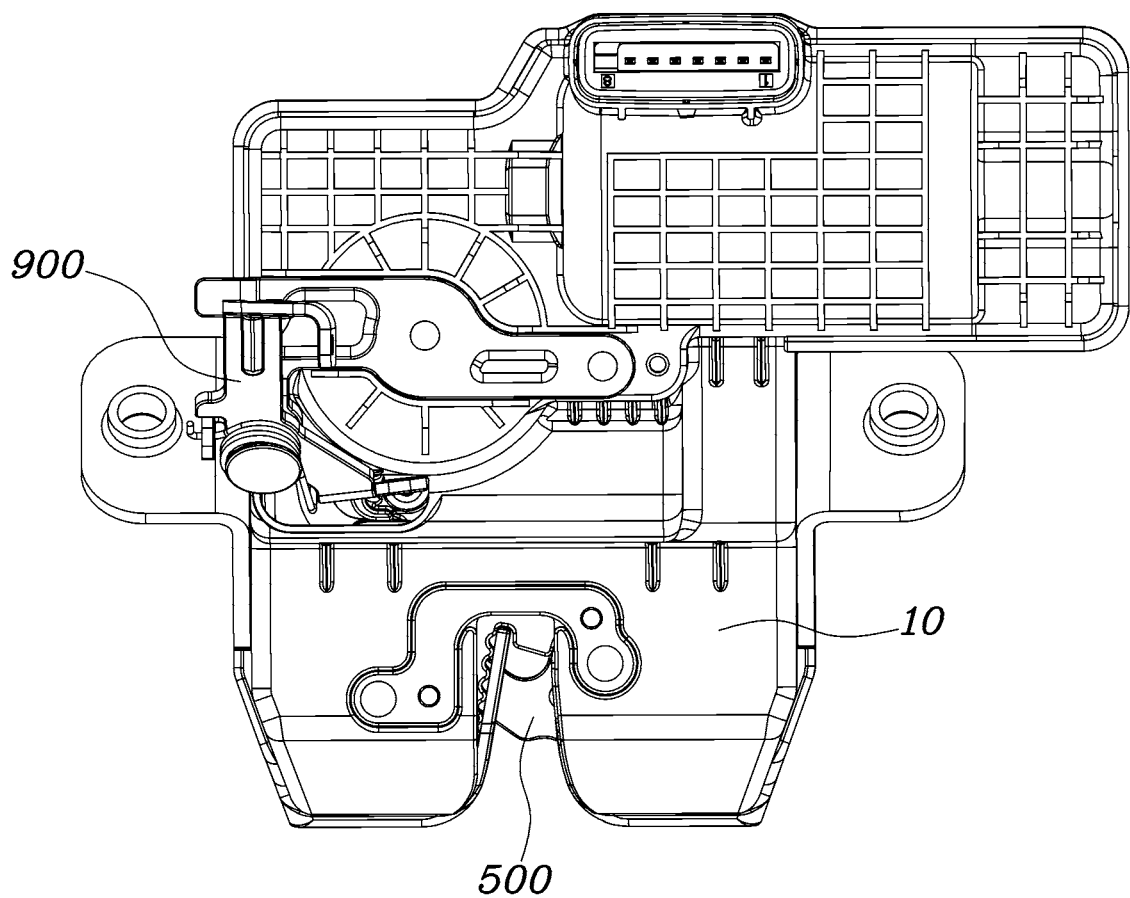
FIG. 1 is a view showing the external appearance of a latch mechanism according to the present disclosure coupled to a tailgate.
Figure 2:
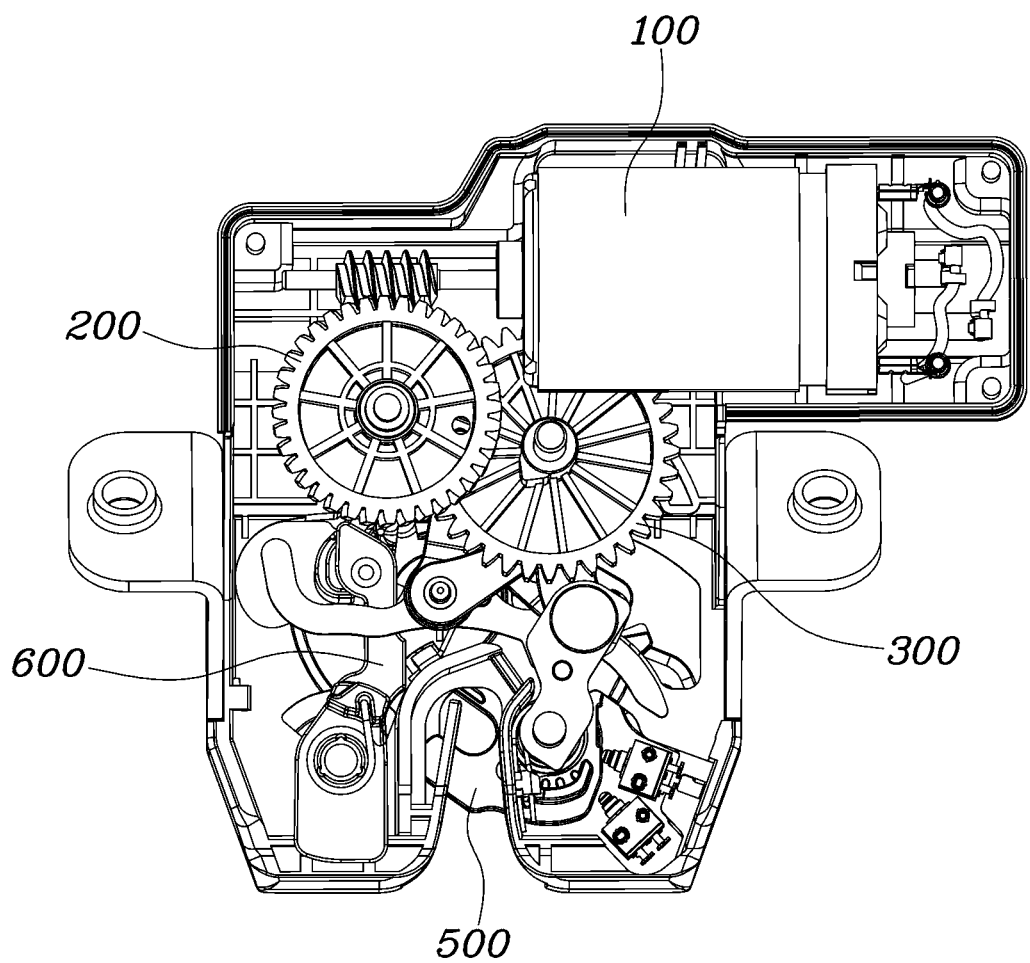
FIG. 2 is a view showing the internal structure of the latch mechanism according to the present disclosure.
Figure 3:
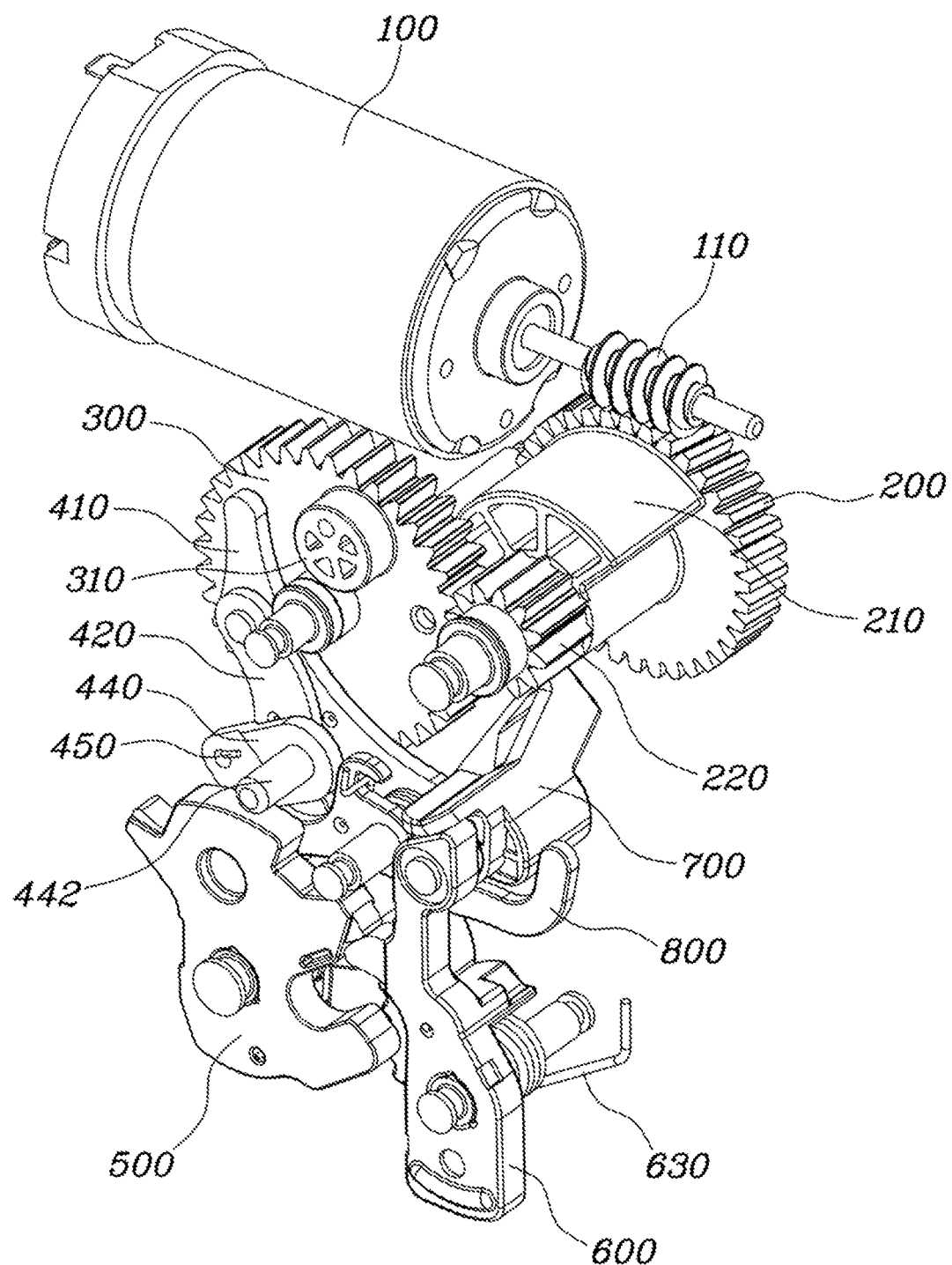
FIG. 3 is a view showing the shapes of internal components of the latch mechanism according to the present disclosure and the coupling relationships therebetween.

FIG. 1 is a view showing the external appearance of a latch mechanism 10 according to the present disclosure coupled to a tailgate, FIG. 2 is a view showing the internal structure of the latch mechanism 10 according to the present disclosure, and FIG. 3 is a view showing the shapes of the internal components of the latch mechanism 10 according to the present disclosure and the coupling relationships therebetween.

Referring to the drawings, the present disclosure includes a release gear 200, which is rotated forwards and backwards by the rotational force transmitted thereto from a motor 100 in order to perform a cinching operation and a release operation, a cinching gear 300, which is engaged with the release gear 200 to rotate, a linkage mechanism 400, which receives force from the cinching gear 300 to rotate toward a claw 500 when the cinching gear 300 rotates for the cinching operation, the claw 500 being caught by the linkage mechanism 400 rotating for the cinching operation to rotate together therewith so as to be engaged with a striker 20, and a pawl unit, which is caught by the claw 500 in the state in which the claw 500 is engaged with the striker 20 so as to restrict rotation of the claw 500 in a release operation direction and rotates together with the release gear 200 only when the release gear 200 rotates in the release operation direction so as to allow rotation of the claw 500 in the release operation direction.

Described in detail, the motor 100, the release gear 200, the cinching gear 300, the linkage mechanism 400, the claw 500, and the pawl unit are mounted in a housing so as to constitute the latch mechanism 10. Mounting brackets are mounted to both side surfaces of the latch mechanism 10. The mounting brackets are bolted to a tailgate. That is, bolts are fastened to one mounting bracket and the other mounting bracket, whereby the latch mechanism 10 is secured to the tailgate.

The motor 100 may be an actuator that performs a cinching operation and a release operation, and may be mounted in the housing so as to be disposed at the uppermost portion of the latch mechanism 10.

A worm gear 110 is secured to the shaft of the motor 100. The worm gear 110 is engaged with the release gear 200. The cinching gear 300 is engaged with the release gear 200, and thus the release gear 200 and the cinching gear 300 are capable of being rotated at the same time. These gears are rotated in the forward direction or the backward direction according to the rotation direction of the motor 100, thereby implementing a cinching operation and a release operation.

The linkage mechanism 400 is a four-bar linkage mechanism, in which links (levers) are connected to each other via two rotary hinge shafts and two fixed hinge shafts. A link (lever) connected to other links (levers) via the two rotary hinge shafts comes into contact with and is pressed by the cinching mechanism during the rotation of the cinching mechanism, whereby the linkage mechanism 400 performs reciprocating movement within a predetermined movement radius.

The claw 500 is mounted to the lower end portion of the linkage mechanism 400 so as to be rotatable about a rotary shaft coupled to the middle portion thereof. The claw 500 has a hook recess 510 formed in a portion of the outer surface of the lower end portion thereof. The striker 20 is engaged in the hook recess 510.

In addition, a plurality of protrusion structures are formed on the outer surface of the claw 500. The protrusion structures are caught by the linkage mechanism 400 or the pawl unit depending on the state of engagement between the claw 500 and the striker 20, thereby allowing or restricting rotation of the claw 500. The protrusion structures will be described in detail later.

The pawl unit is mounted opposite the claw 500. The pawl unit is elongated in an upward-downward longitudinal direction. The pawl unit is provided at the lower end thereof with a rotary shaft such that the upper portion of the rotary shaft is rotatable in a direction toward the claw 500. The pawl unit includes pawl 600 and pawl lever 700.

Accordingly, when the latch mechanism 10 operates, the pawl unit is caught by or released from the claw 500, thereby restricting or allowing rotation of the claw 500.

The upper end portion of the pawl unit is located within the rotation radius of the release gear 200, and is therefore caught by the release gear 200 when the release gear 200 rotates. Specifically, when the release gear 200 rotates in the cinching operation direction, the upper end portion of the pawl unit, which interferes with the release gear 200, rotates alone, thereby maintaining the state in which the pawl unit restricts rotation of the claw 500.

In contrast, when the release gear 200 rotates in the release operation direction, the upper end portion of the pawl unit, which interferes with the release gear 200, and the entire remaining portion of the pawl unit rotate about the rotary shaft, thereby switching to the state in which the pawl unit allows rotation of the claw 500.

That is, in the cinching operation, the motor 100 is rotated in one direction such that the release gear 200 is rotated in the forward direction and the cinching gear 300 is rotated in the backward direction, with the result that the cinching gear 300 presses the linkage mechanism 400. However, in this case, when the release gear 200 is rotated in the forward direction, the upper end portion of the pawl unit is rotated alone, and the lower end portion of the pawl unit is not changed in rotational position.

Accordingly, upon movement of the linkage mechanism 400, the linkage mechanism 400 is caught by the claw 500, and thus the claw 500 is rotated such that the hook recess 510 in the claw 500 faces the striker 20.

Therefore, the striker 20 is completely engaged in the hook recess 510, and the protrusion structures of the claw 500 are caught by the pawl unit, with the result that the claw 500 and the striker 20 are completely locked.

On the other hand, in the release operation, the motor 100 is rotated in the opposite direction such that the release gear 200 is rotated in the backward direction.

When the release gear 200 is rotated in the backward direction, not only the upper end portion of the pawl unit but also the entire remaining portion of the pawl unit are rotated, whereby the pawl unit is separated from the claw 500.

Accordingly, the claw 500 is rotated such that the hook recess 510 in the claw 500 is separated from the striker 20. Thus, the striker 20 is released from the hook recess 510. Finally, the claw 500 and the striker 20 are unlocked.

As described above, according to the present disclosure, it is possible to perform a cinching operation and a release operation using a single motor 100, rather than separately mounting a motor for a cinching operation and a motor for a release operation, thereby reducing the number of components, thus reducing the manufacturing cost and the weight of the device and improving the operability of the device.

Figure 4A:
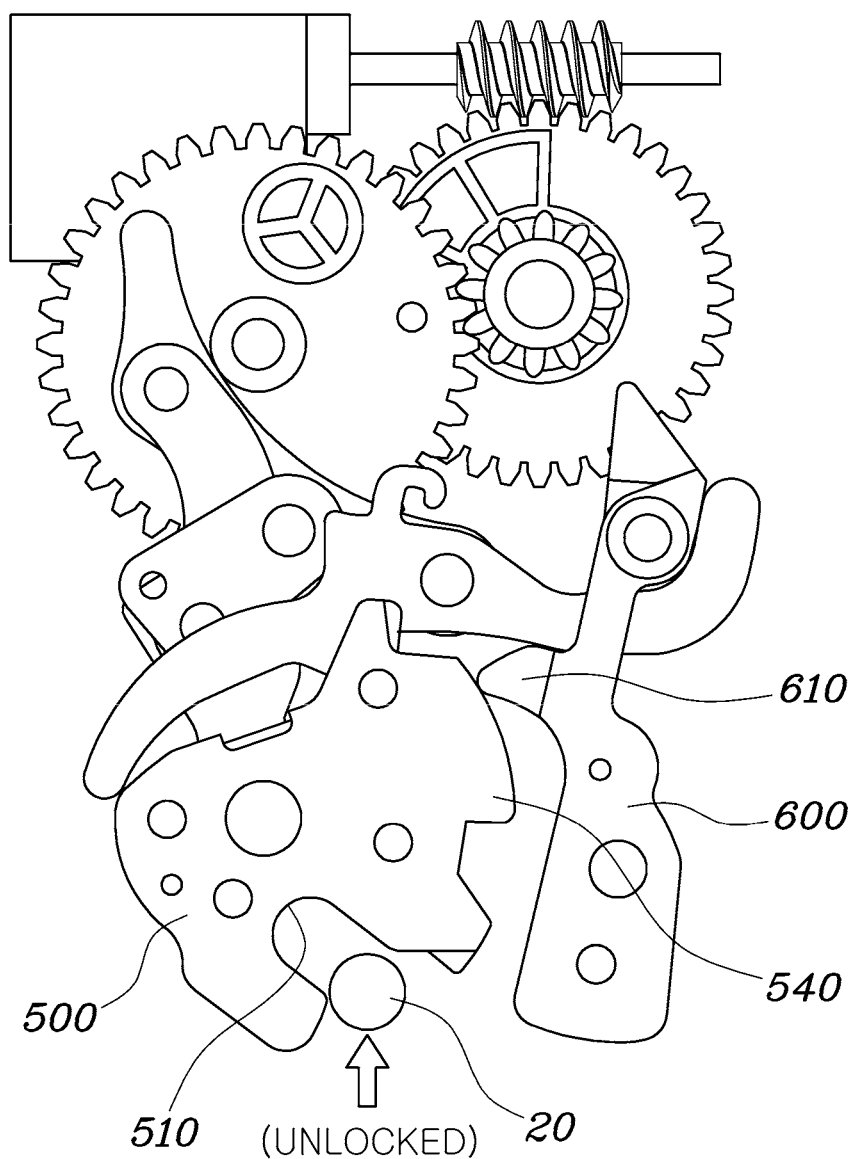
FIGS. 4A and 4B are views for explaining a process in which a claw according to the present disclosure is operated to change from an unlocked state to a half-locked state.
Figure 4B:
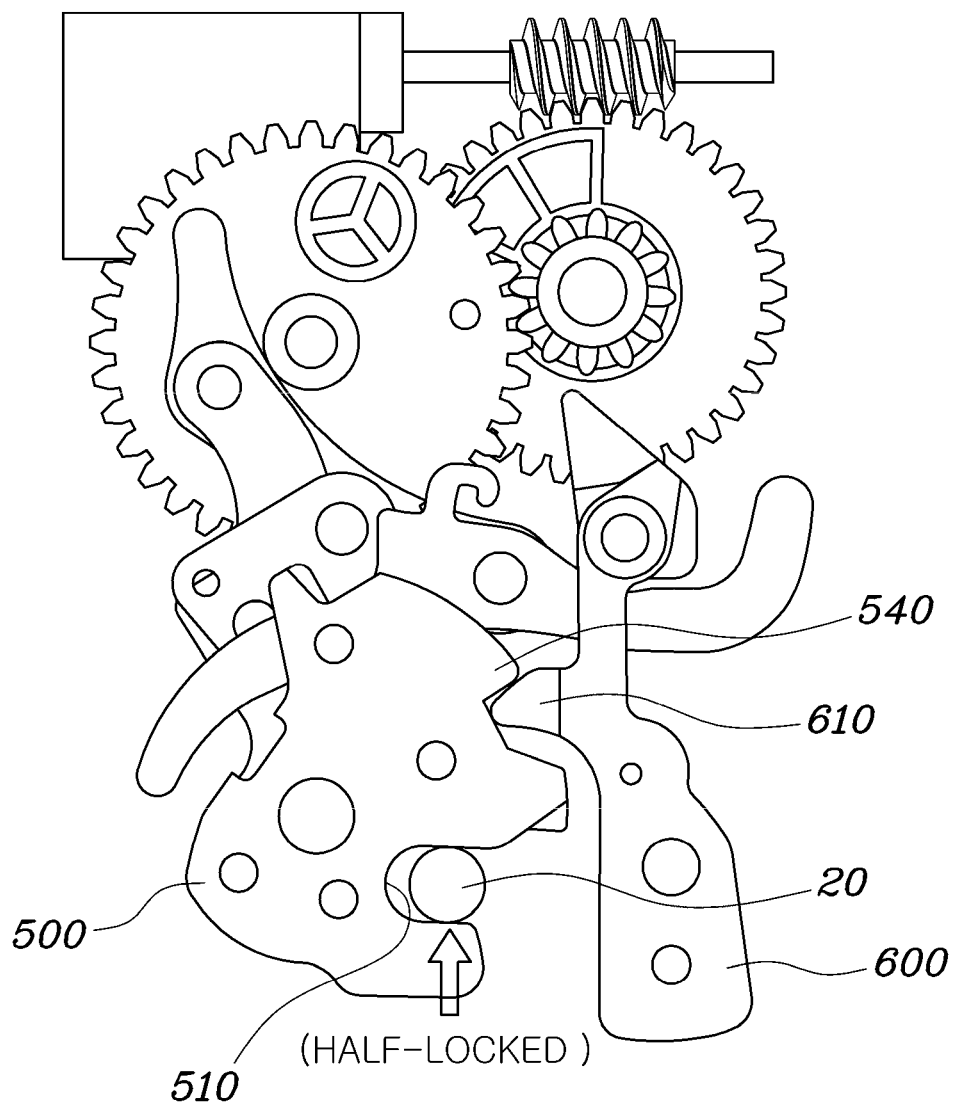

FIGS. 4A and 4B are views for explaining a process in which the claw 500 according to the present disclosure is operated to change from an unlocked state to a half-locked state.

Referring to the drawings, the hook recess 510 is formed in the outer surface of the claw 500 that faces the striker 20. When the striker 20 is introduced into the hook recess 510, the claw 500 is rotated about the rotary shaft thereof such that the striker 20 is half-locked to the hook recess 510.

To this end, the position of the rotary shaft of the claw 500 in the leftward-rightward direction needs to be spaced a predetermined distance apart from the position of the striker 20 in the leftward-rightward direction, and the position of the entrance of the hook recess 510 in the leftward-rightward direction needs to coincide with the position of the striker 20 in the leftward-rightward direction in the unlocked state.

That is, when the tailgate is closed from the unlocked state, in which the tailgate is open, the tailgate moves downwards, and the upper surface of the entrance of the hook recess 510 in the claw 500 is pressed by the striker 20 due to the weight of the tailgate.

Accordingly, the claw 500 is rotated about the rotary shaft thereof by the pressing force of the striker 20, and the striker 20 enters the hook recess 510 and is half-locked to the hook recess 510.

In the present disclosure, when the above-described half-locked state is detected, a cinching operation is performed.

To this end, the present disclosure further includes a half-lock detection sensor 520 (shown in FIG. 10) for detecting the half-locked position of the claw 500 and a controller CRL for controlling the motor 100 to rotate in the cinching operation direction when the half-locked position is detected.

Figure 10:
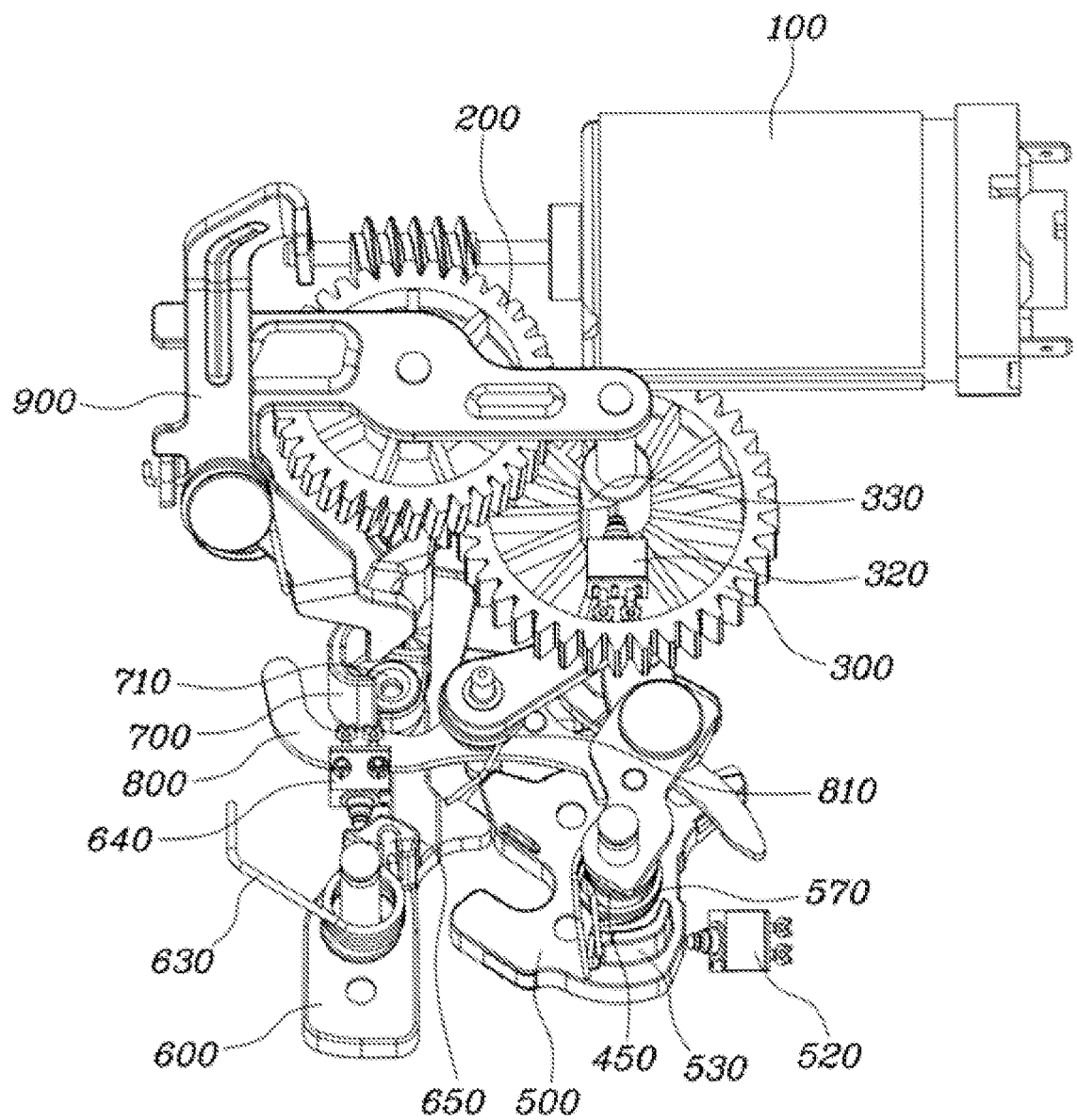
FIG. 10 is a view showing the configuration in which an emergency lever is coupled to the latch mechanism according to the present disclosure.
Figure 12:
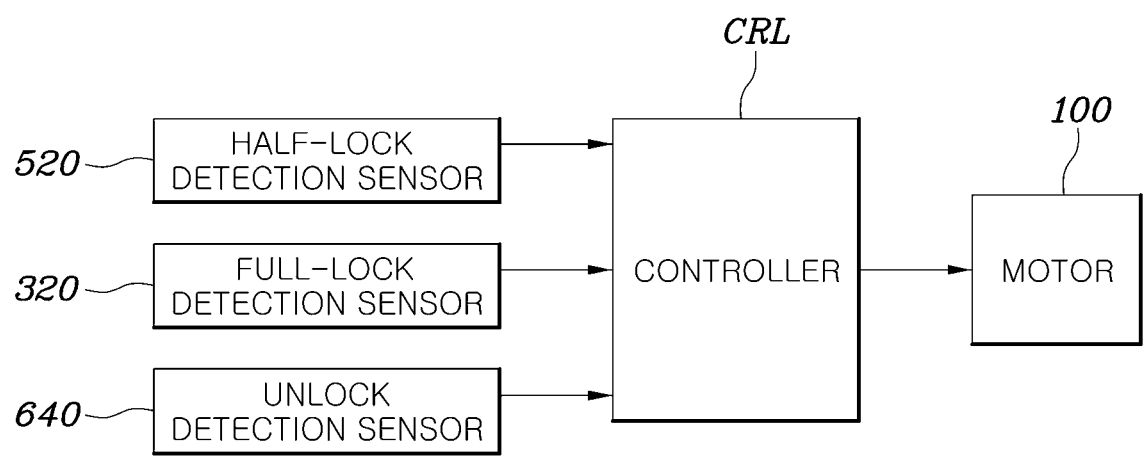
FIG. 12 is a block diagram schematically showing the configuration for detecting the locked state of the claw and the striker according to the present disclosure.

Referring to FIGS. 10 and 12, a half-lock detection protrusion 530 is formed on the circumference of the rotary shaft of the claw 500, and the half-lock detection sensor 520 detects the half-locked state depending on whether the half-lock detection protrusion 530 is detected.

For example, a half-lock detection protrusion 530 having an arc shape is formed on the circumference of the rotary shaft of the claw 500, and a half-lock detection sensor 520 is provided beside the half-lock detection protrusion 530.

When the half-lock detection sensor 520 detects the half-lock detection protrusion 530, it is determined that the operation state is a state other than the half-locked state, and when the half-lock detection sensor 520 does not detect the half-lock detection protrusion 530, it is determined that the operation state is the half-locked state.

Of course, the structure for detecting the half-locked state is not limited to the half-lock detection protrusion 530. Alternatively, it is possible to detect the half-locked state by detecting movement of a specific component other than the half-lock detection protrusion 530.

For reference, the controller CRL according to an exemplary embodiment of the present disclosure may be implemented through a processor (not shown) configured to execute the operations to be described below using a non-volatile memory (not shown), which is configured to store an algorithm for controlling the operation of various components of a vehicle or data related to a software command for executing the algorithm, and data stored in the corresponding memory. Here, the memory and the processor may be implemented as respective chips. Alternatively, the memory and the processor may be implemented as a single integrated chip. The processor may alternatively take the form of one or more processors.

In addition, the present disclosure may be configured to prevent the claw 500 from rotating such that the striker 20 is released from the claw 500 in the half-locked state.

Referring to FIG. 4B, a first restricting protrusion 540 is formed on the outer surface of the claw 500 so as to protrude toward the pawl unit, and a locking protrusion 610 is formed on the outer surface of the pawl unit so as to protrude toward the claw 500. In the half-locked state of the claw 500, the locking protrusion 610 is caught by the first restricting protrusion 540, thereby restricting rotation of the claw 500 in the release operation direction.

For example, a first restricting protrusion 540 having a step-like shape is formed on the outer surface of the claw 500 at a position that is spaced apart from the hook recess 510 in the claw 500 in the direction in which the claw 500 rotates to perform a cinching operation.

The pawl unit includes a pawl 600 formed at a lower end portion thereof and a pawl lever 700 formed at an upper end portion thereof. The locking protrusion 610 is formed on one surface of the pawl 600, which faces the claw 500, so as to protrude toward the claw 500.

That is, in the half-locked state, the locking protrusion 610 formed on the pawl 600 is caught by the first restricting protrusion 540 formed on the claw 500, thereby preventing the claw 500 from rotating in the release operation direction.

Figure 5A:
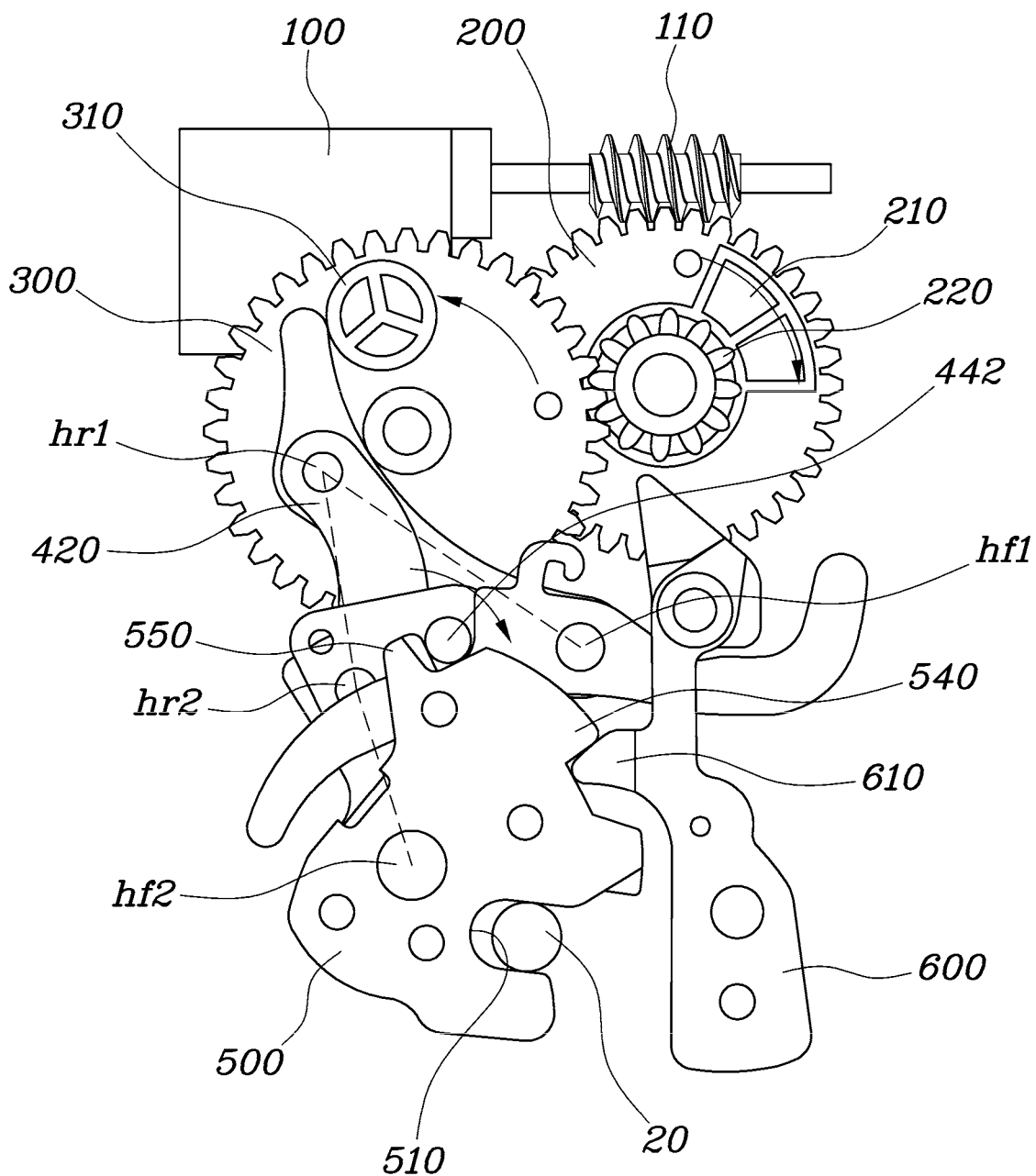
FIGS. 5A, 5B, and 5C are views for explaining a process in which a cinching operation is performed by a motor in the half-locked state of the claw according to the present disclosure.
Figure 5B:
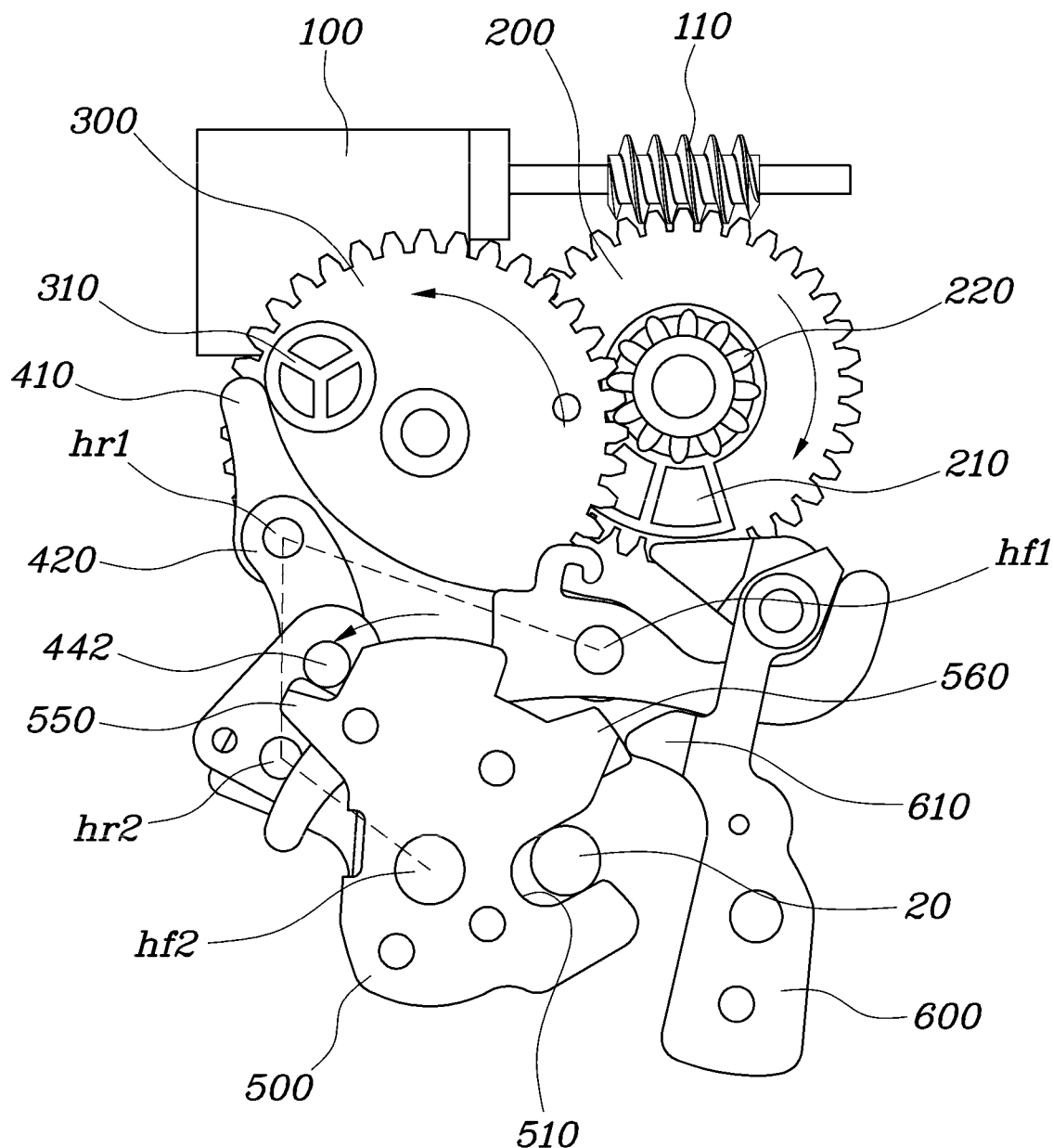
Figure 5C:
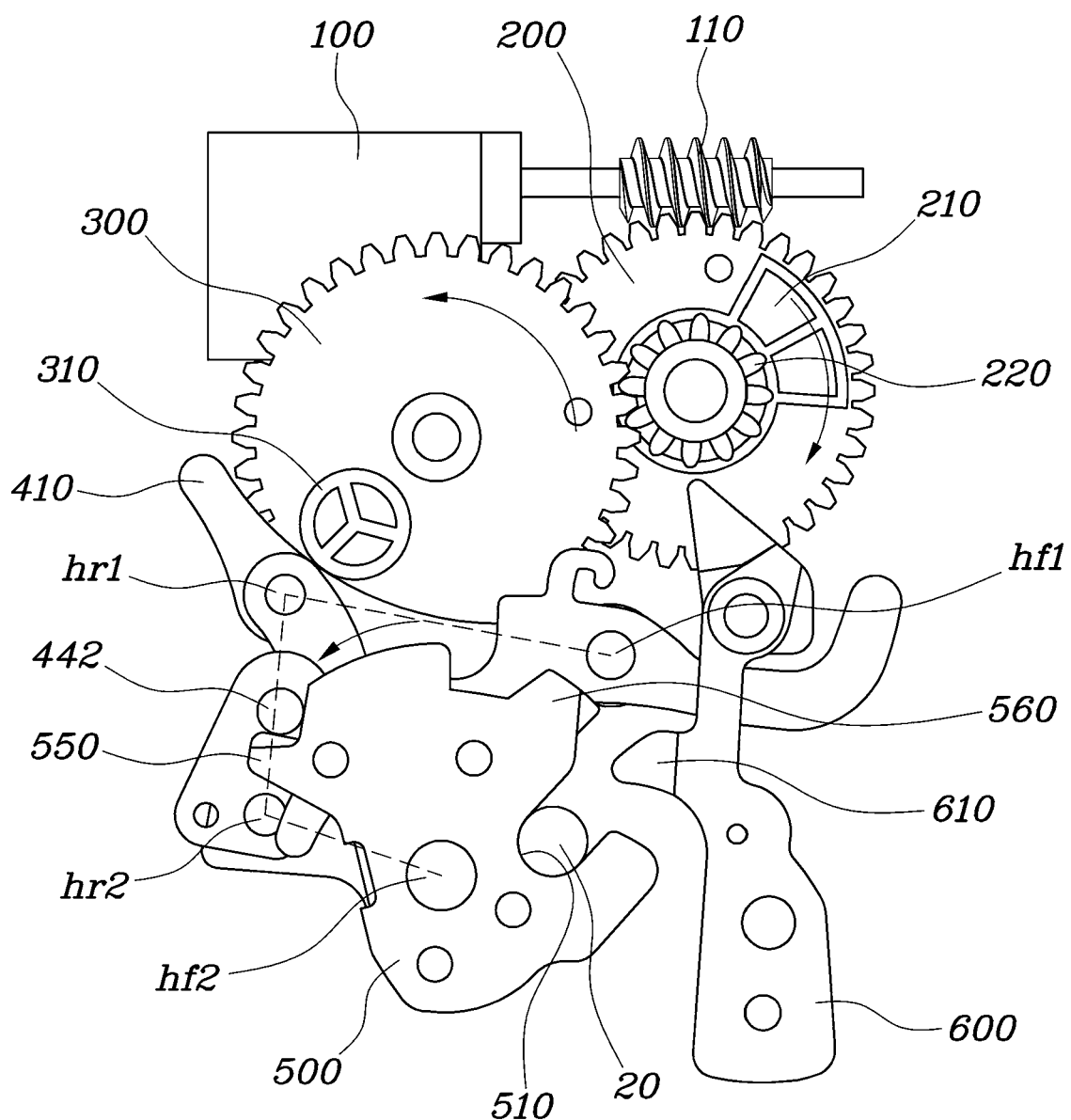

FIGS. 5A to 5C are views for explaining a process in which a cinching operation is performed by the motor 100 in the half-locked state of the claw 500 according to the present disclosure.

Referring to the drawings, a cinching protrusion 310 is formed on a portion of the cinching gear 300 in the circumferential direction of the cinching gear 300. A portion of the linkage mechanism 400 (shown in FIG. 6A) is located in the rotation path of the cinching protrusion 310, whereby the cinching protrusion 310 applies pressing force to the linkage mechanism 400 when rotating.

For example, a cinching protrusion 310 having a circular shape may protrude from one surface of the cinching gear 300 so as to press the linkage mechanism 400 while the cinching gear 300 rotates.

That is, when the release gear 200 is rotated in the forward direction according to operation of the motor 100, the cinching gear 300 is rotated in the backward direction, and the cinching protrusion 310 pushes the linkage mechanism 400, which is located in the rotation path thereof, toward the claw 500. As a result, the linkage mechanism 400 is moved while rotating within the predetermined movement radius thereof.

Figure 6A:
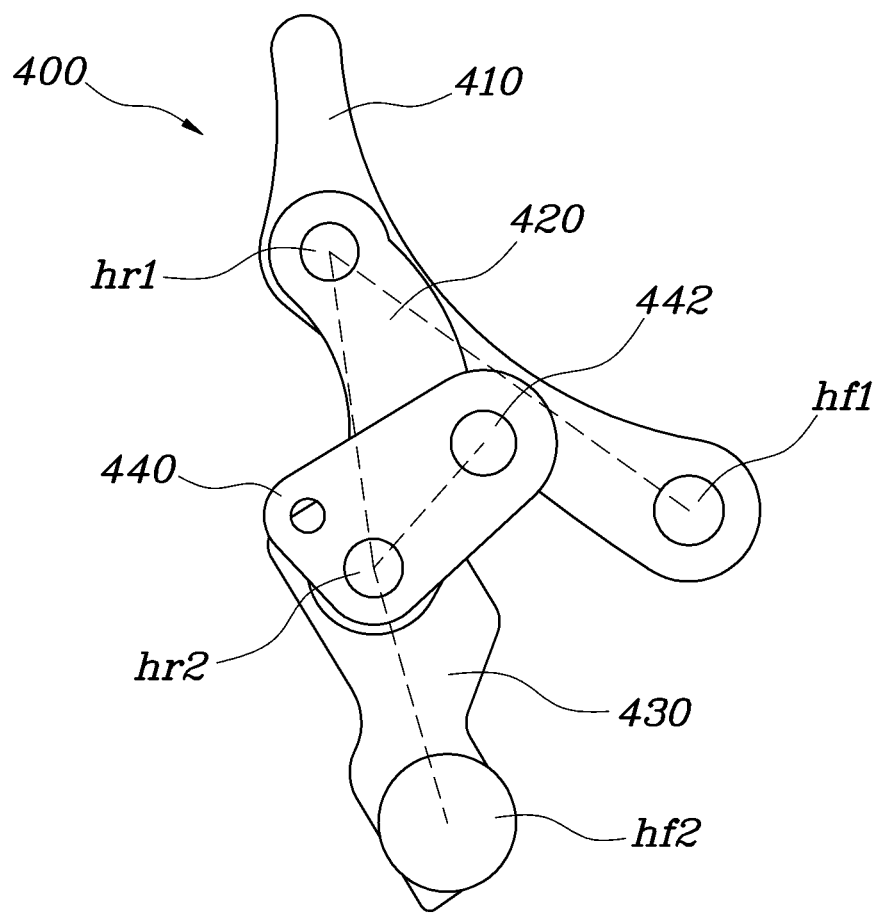
FIGS. 6A, 6B, and 6C are views showing the operation of the linkage mechanism shown in FIGS. 5A to 5C.
Figure 6B:
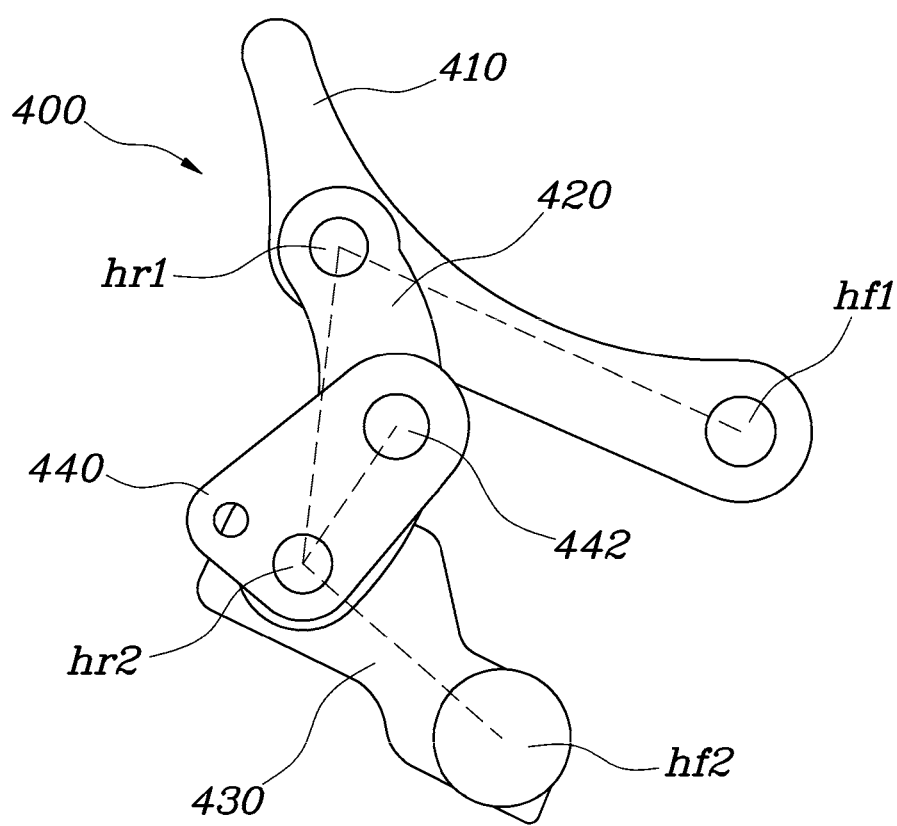
Figure 6C:
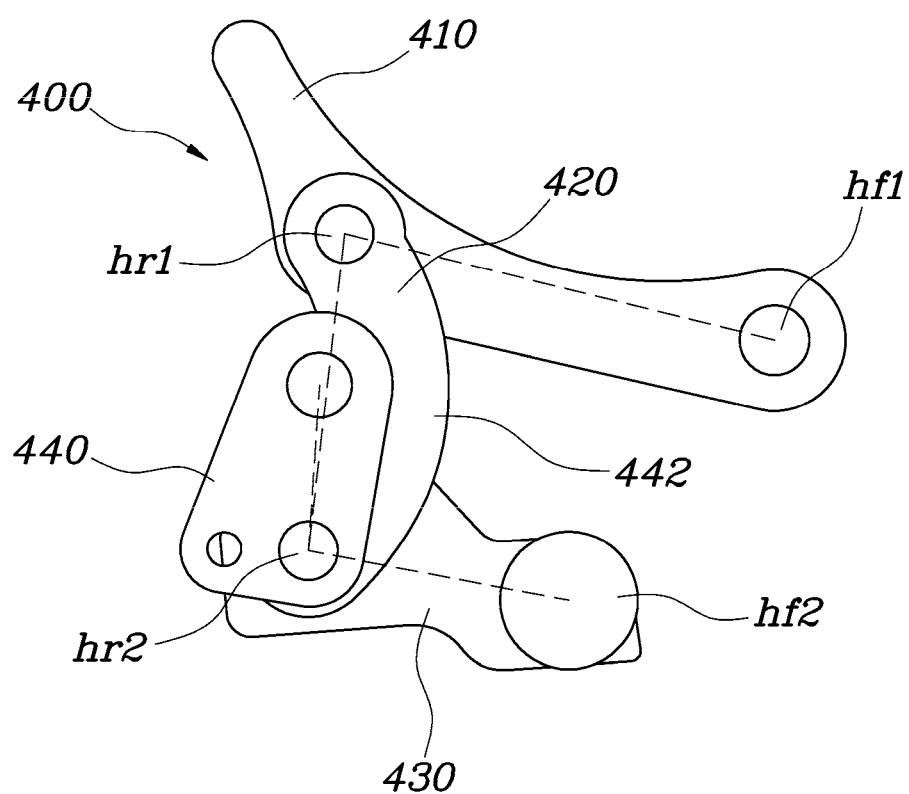

FIGS. 6A to 6C are views showing the operation of the linkage mechanism 400 shown in FIGS. 5A to 5C. Describing the structure of the linkage mechanism 400 in detail, the linkage mechanism 400 includes a crank lever 410, which has one end to which a first fixed hinge shaft hf1 is coupled and an opposite end to which a first rotary hinge shaft hr1 is coupled, a coupler lever 420, which has one end coupled to the first rotary hinge shaft hr1 and an opposite end to which a second rotary hinge shaft hr2 is coupled, and a follower lever 430, which has one end to which a second fixed hinge shaft hf2 is coupled and an opposite end coupled to the second rotary hinge shaft hr2.

When the outer surface of the crank lever 410 is pressed by the cinching protrusion 310, the first rotary hinge shaft hr1 and the second rotary hinge shaft hr2 are rotated about the first fixed hinge shaft hf1 and the second fixed hinge shaft hf2. In this manner, the above-described levers are rotated.

To this end, upon operation of the linkage mechanism 400, while the first fixed hinge shaft hf1 and the second fixed hinge shaft hf2 are fixed in position, the first rotary hinge shaft hr1 and the second rotary hinge shaft hr2 are moved and changed in position in the manner of being interlocked with the movement of the above levers.

In particular, since the crank lever 410 is pressed in the state of being in contact with the cinching protrusion 310, the crank lever 410 may be formed such that the overall length thereof extends to the maximum radial position of the cinching protrusion 310.

Further, one surface of the crank lever 410, which is in contact with the cinching protrusion 310, is formed in a concave arc shape, whereby the cinching protrusion 310 is capable of smoothly sliding along the crank lever 410.

In addition, referring to FIGS. 5A to 5C, the present disclosure further includes a cinching lever 440, which has one end coupled to the second rotary hinge shaft hr2 and an opposite end to which a cinching shaft 442 is secured, and a cinching spring 450, which applies elastic force to the cinching lever 440 such that the cinching shaft 442 rotates toward the claw 500 about the second rotary hinge shaft hr2.

A latching protrusion 550 is formed on a portion of the outer surface of the claw 500. In the process in which the cinching lever 440 rotates toward the claw 500, the cinching shaft 442 is caught by the latching protrusion 550, and thus the claw 500 is rotated so as to be engaged with the striker 20.

For example, a latching protrusion 550 having a step-like shape is formed on the outer surface of the claw 500 at a position that is opposite the hook recess 510 in the claw 500.

The cinching spring 450 may be a torsion spring. The cinching spring 450 is disposed around the second fixed hinge shaft hf2, which is the rotary shaft of the claw 500, such that one end thereof is supported by the housing of the latch mechanism 10 and the opposite end thereof is caught by the cinching lever 440, which is adjacent to the cinching shaft 442.

When the claw 500 is rotated in the cinching operation direction, the cinching shaft 442 is moved toward the claw 500 by the elastic force of the cinching spring 450, and is then caught by the latching protrusion 550 formed on the claw 500. In this state, since the cinching gear 300 rotates further in the cinching operation direction, the cinching shaft 442 rotates the claw 500.

When the cinching shaft 442 is released from the latching protrusion 550, the cinching spring 450 applies elastic force to the linkage mechanism 400 so that the linkage mechanism 400 returns toward the cinching gear 300.

Figure 8A:
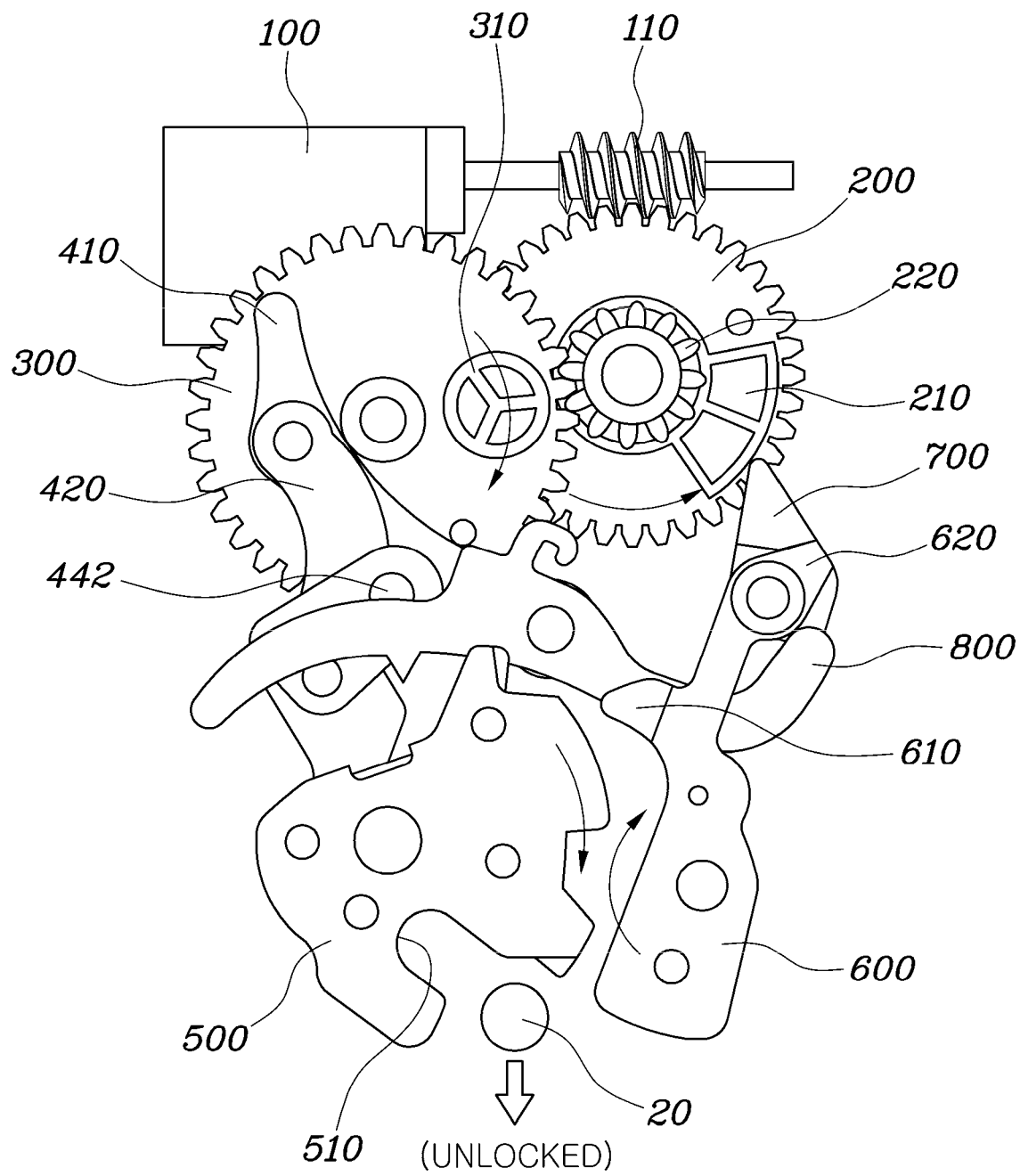
FIGS. 8A and 8B are views for explaining a process in which a release operation is performed by the motor in the fully locked state according to the present disclosure.
Figure 8B:
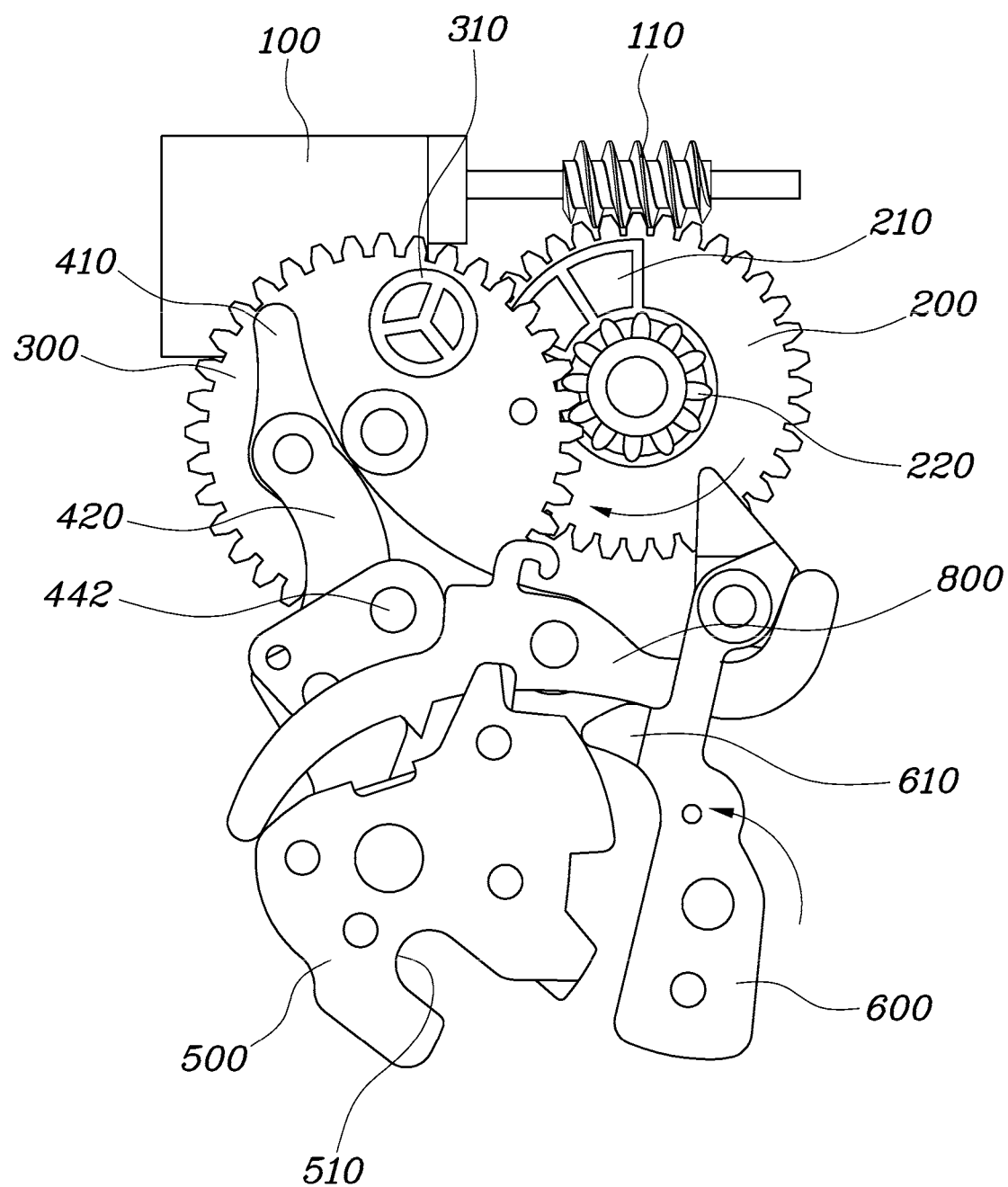

FIGS. 8A and 8B are views for explaining a process in which the release operation is performed by the motor 100 in the fully locked state according to the present disclosure.

Referring to the drawings, a release protrusion 210 is formed on a portion of the release gear 200 in the circumferential direction of the release gear 200.

The pawl unit includes a pawl 600, which is disposed opposite the claw 500 and is configured to rotate about the rotary shaft thereof, and a pawl lever 700, which has one end located in the rotation path of the release protrusion 210 so as to interfere with the release protrusion 210 and an opposite end disposed at an end portion of the pawl 600 so as to be rotated alone when the release gear 200 is rotated in the cinching operation direction and to be rotated together with the pawl 600 when the release gear 200 is rotated in the release operation direction.

For example, the release protrusion 210 is formed on a portion of one surface of the release gear 200, and forms a predetermined rotation path when the release gear 200 rotates.

The pawl lever 700 is located within the rotation radius of the release gear 200. The pawl lever 700 is not rotated in the release operation direction at the upper end of the pawl 600, and is rotated only in the cinching operation direction.

That is, when the release gear 200 is rotated in the release operation direction, the release protrusion 210 is caught by the pawl lever 700, whereby the pawl 600 and the pawl lever 700 are rotated together about the rotary shaft of the pawl 600.

Of course, when the release gear 200 is rotated in the cinching operation direction, the release protrusion 210 is caught by the pawl lever 700. However, the pawl lever 700 is rotated alone, and the pawl 600 is not rotated.

Referring to FIG. 10, the present disclosure may further include a pawl lever spring 710, which applies elastic force to the pawl lever 700 in the direction in which the pawl lever 700 is rotated alone relative to the pawl 600.

For example, the pawl lever spring 710 may be a torsion spring. The pawl lever spring 710 is disposed around the rotary shaft connecting the pawl lever 700 and the pawl 600, and applies elastic force to the pawl lever 700 at all times in the direction in which the pawl lever 700 is rotated for a release operation.

Referring to FIGS. 8A and 8B, a stopper 620 is formed between the pawl 600 and the pawl lever 700. The stopper 620 may be located in the rotation path of the pawl lever 700, which is rotated together with the pawl 600.

For example, a stopper 620 having a triangular shape is formed on one surface of the rotary shaft coupled to the upper end of the pawl 600. In the release rotation of the release protrusion 210, when the release protrusion 210 pushes the pawl lever 700, the pawl lever 700 is caught by the stopper 620, and is thus incapable of being rotated alone. As a result, the pawl 600 is rotated together with the pawl lever 700.

According to the present disclosure, when the claw 500 is fully locked to the striker 20, the operation of the motor 100 is stopped.

To this end, the present disclosure further includes a full-lock detection sensor 320, which detects the fully locked position of the claw 500 when the claw 500 is fully locked to the striker 20 by the cinching operation of the motor 100, and a controller CRL, which controls the motor 100 to stop operating when the fully locked position of the claw 500 is detected.

Referring to FIGS. 10 and 12, a full-lock detection protrusion 330 is formed on the circumference of the rotary shaft of the cinching gear 300. The full-lock detection sensor 320 detects the fully locked state depending on whether the full-lock detection protrusion 330 is detected.

For example, a full-lock detection protrusion 330 having a triangular shape is formed on a portion of the circumference of the rotary shaft of the cinching gear 300, and a full-lock detection sensor 320 is provided beside the full-lock detection protrusion 330.

When the full-lock detection sensor 320 detects the full-lock detection protrusion 330, it is determined that the operation state is the fully locked state, and when the full-lock detection sensor 320 does not detect the full-lock detection protrusion 330, it is determined that the operation state is a state other than the fully locked state.

Of course, the structure for detecting the fully locked state is not limited to the full-lock detection protrusion 330. Alternatively, it is possible to detect the fully locked state by detecting movement of a specific component other than the full-lock detection protrusion 330.

In addition, a pinion 220 (shown in FIG. 11A) is secured to the rotary shaft of the release gear 200. The pinion 220 is externally engaged with the cinching gear 300 at a predetermined reduction gear ratio. When the motor 100 is rotated in the cinching operation direction and the full-lock detection protrusion 330, which is rotated according to the reduction gear ratio, is detected by the full-lock detection sensor 320, it is determined that the operation state is the fully locked state.

For example, the pinion 220 and the cinching gear 300 may be formed to have a gear ratio of 3:1. When the pinion 220 rotates three times, the cinching gear 300 rotates one time.

That is, only one full-lock detection protrusion 330 for detection of the fully locked state is formed on the rotary shaft of the cinching gear 300. To this end, the present disclosure is configured such that the cinching gear 300 rotates only one time from the starting point, corresponding to the half-locked state, to the ending point, corresponding to the fully locked state.

As described above, it is possible to detect the fully locked state using only one full-lock detection protrusion 330 by appropriately setting the gear ratio between the pinion 220 and the cinching gear 300.

Figure 7:
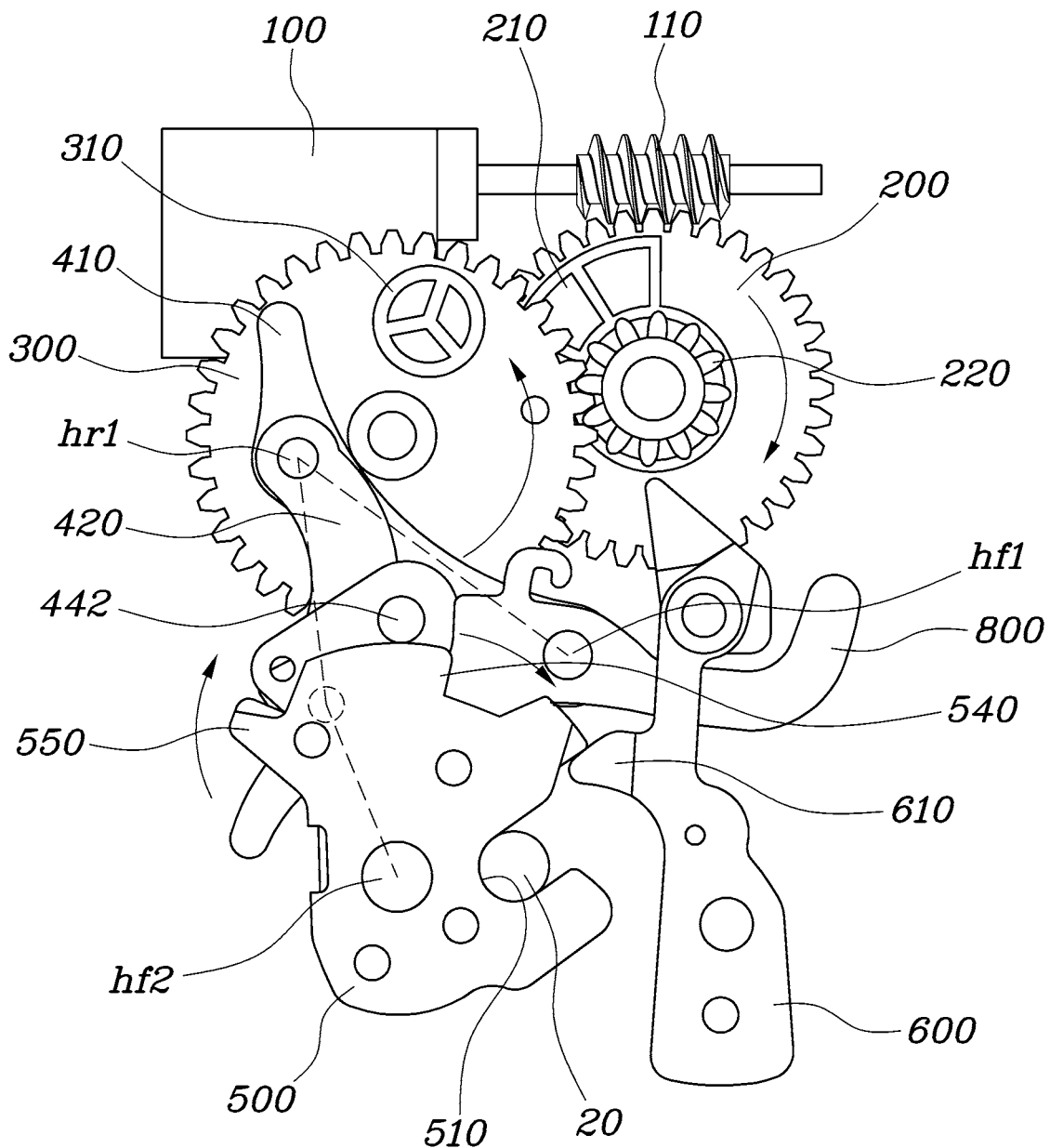
FIG. 7 is a view showing a fully locked state of the claw according to the present disclosure.

FIG. 7 is a view showing the fully locked state of the claw 500 according to the present disclosure.

Referring to the drawing, a second restricting protrusion 560 (shown in FIG. 5B) is formed on the outer surface of the claw 500 so as to protrude toward the pawl unit, and a locking protrusion 610 is formed on the outer surface of the pawl unit so as to protrude toward the claw 500. When the claw 500 is located at the fully locked position, the locking protrusion 610 is caught by the second restricting protrusion 560, thereby restricting rotation of the claw 500 in the release operation direction.

For example, a second restricting protrusion 560 having a step-like shape is formed on the outer surface of the claw 500 at a position that is spaced apart from the hook recess 510 in the claw 500 in the direction in which the claw 500 rotates to perform a cinching operation. The second restricting protrusion 560 is formed between the first restricting protrusion 540 and the hook recess 510.

The locking protrusion 610 is formed on one surface of the pawl 600, which faces the claw 500, so as to protrude toward the claw 500.

That is, in the fully locked state, the locking protrusion 610 formed on the pawl 600 is caught by the second restricting protrusion 560 formed on the claw 500, thereby preventing the claw 500 from rotating in the release operation direction in the state of being fully locked to the striker 20.

The locking protrusion 610 is formed on the upper end of the rotary shaft of the pawl 600. In addition, the present disclosure further includes a pawl spring 630, which applies elastic force to the pawl 600 so that the locking protrusion 610 rotates toward the claw 500, and a claw spring 570 (shown in FIG. 10), which applies elastic force to the claw 500 in the direction in which the claw 500 rotates to perform a release operation.

For example, as shown in FIG. 10, the pawl spring 630 may be a torsion spring. The pawl spring 630 is disposed around the rotary shaft of the pawl 600 such that one end thereof is supported by the housing of the latch mechanism 10 and the opposite end thereof is caught by the upper end of the pawl 600.

Accordingly, the pawl spring 630 applies elastic force to the pawl 600 at all times such that the upper end of the pawl 600 is rotated toward the claw 500. Thus, the locking protrusion 610 is maintained in the state of being caught by the first restricting protrusion 540 as well as the second restricting protrusion 560 of the claw 500, thereby restricting rotation of the claw 500 in the release operation direction.

In addition, the claw spring 570 may be a torsion spring. The claw spring 570 is disposed around the second fixed hinge shaft hf2, which is the rotary shaft of the claw 500, such that one end thereof is supported by the housing of the latch mechanism 10 and the opposite end thereof is caught by the claw 500.

Accordingly, the claw spring 570 applies elastic force to the claw 500 at all times such that the claw 500 is rotated in the release operation direction. Thus, in the state in which the first restricting protrusion 540 and the second restricting protrusion 560 are caught by the locking protrusion 610 of the pawl 600, the claw spring 570 stably maintains the engaged state of the claw 500. In the state in which the first restricting protrusion 540 and the second restricting protrusion 560 are released from the locking protrusion 610 of the pawl 600, the claw spring 570 rotates the claw 500 in the release operation direction such that the claw 500 returns to the unlocked state.

Referring to FIGS. 8A, 8B, 10 and 12, the present disclosure further includes an unlock detection sensor 640, which detects the unlocked position of the pawl 600 when the pawl lever 700 and the pawl 600 are rotated together by the release protrusion 210 according to the release operation of the motor 100 and thus the claw 500 is released from the striker 20. The controller CRL may control the motor 100 to stop operating when the unlocked position is detected.

Specifically, an unlock detection protrusion 650 is formed on the circumference of the rotary shaft of the pawl 600, and the unlock detection sensor 640 detects the unlocked state depending on whether the unlock detection protrusion 650 is detected.

For example, an unlock detection protrusion 650 having an arc shape is formed on the circumference of the rotary shaft of the pawl 600, and an unlock detection sensor 640 is provided beside the unlock detection protrusion 650.

When the unlock detection sensor 640 detects the unlock detection protrusion 650, it is determined that the operation state is the unlocked state, and when the unlock detection sensor 640 does not detect the unlock detection protrusion 650, it is determined that the operation state is a state other than the unlocked state.

For reference, the state in which the unlocked state is detected by the unlock detection sensor 640 may be a state in which the release protrusion 210 is rotated in the release operation direction so as to rotate the pawl lever 700 and the pawl 600 together and in which the outer periphery of the release protrusion 210 is in contact with the pawl lever 700.

Of course, the structure for detecting the unlocked state is not limited to the unlock detection protrusion 650. Alternatively, it is possible to detect the unlocked state by detecting movement of a specific component other than the unlock detection protrusion 650.

The controller CRL may stop the motor 100 when detecting the unlocked position of the pawl 600, and may control the motor 100 to return to the state prior to the release operation when a predetermined period of time elapses after the motor 100 is stopped.

That is, after the motor 100 is stopped, the controller CRL maintains the state in which the release protrusion 210 pushes the pawl lever 700 for a predetermined period of time, thereby creating the state in which the movement of the claw 500 is not restricted by the pawl 600. Accordingly, even if the tailgate sags toward the striker 20 due to the weight thereof, the claw 500 is not engaged with the striker 20 again, thereby preventing unexpected locking of the claw 500.

Figure 9A:
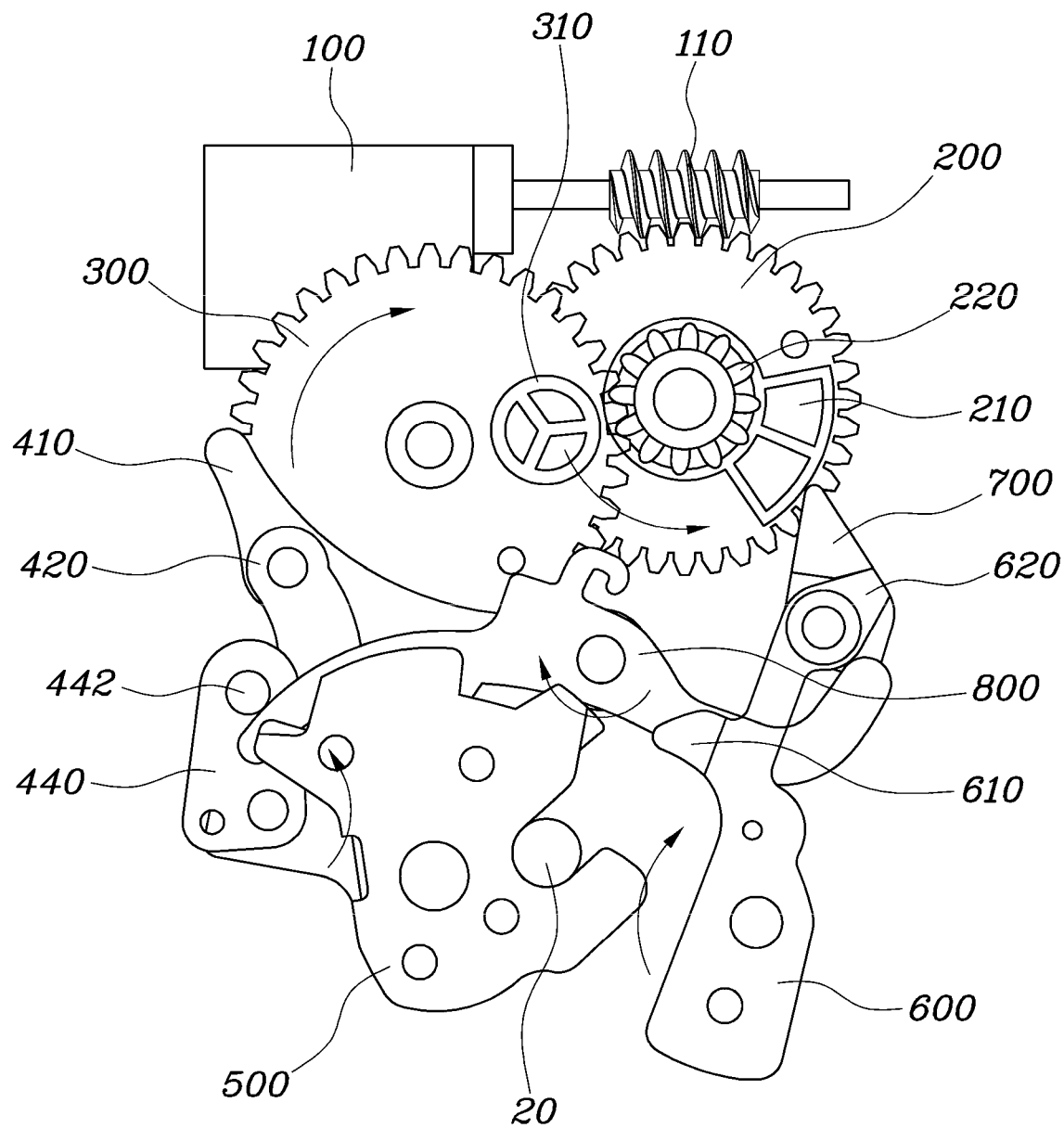
FIGS. 9A and 9B are views for explaining a process in which the release operation is performed by the motor during the cinching operation according to the present disclosure.
Figure 9B:
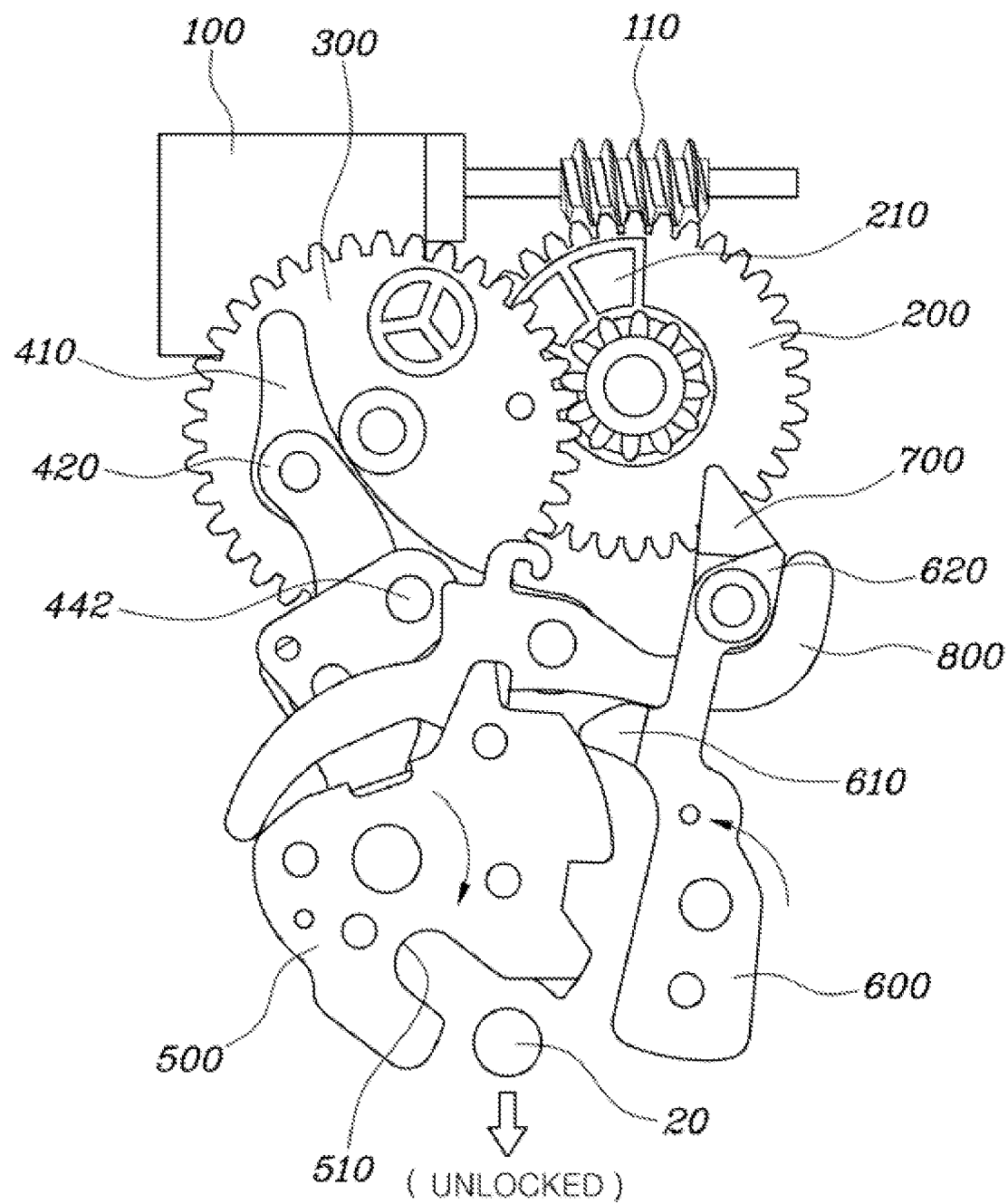

FIGS. 9A and 9B are views for explaining a process in which the release operation is performed by the motor 100 during the cinching operation according to the present disclosure.

Referring to the drawings, the present disclosure may further include an interrupt lever 800, which has one end that is pressed by the pawl 600 in the release operation and which is configured to rotate about the middle portion thereof such that the opposite end thereof pushes up the cinching shaft 442 so as to release the cinching shaft 442 from the latching protrusion 550 of the claw 500.

For example, a rotary shaft provided at the middle portion of the interrupt lever 800 is coupled to the first fixed hinge shaft hf1, and one end of the interrupt lever 800 is bent upwards so as to be located in the path along which the upper end of the pawl 600 is rotated in the release operation direction.

Accordingly, when the release gear 200 is rotated in the release operation direction, the release protrusion 210 pushes the pawl lever 700 and the pawl 600 together, thereby pressing one end of the interrupt lever 800.

The opposite end of the interrupt lever 800 is located below the latching protrusion 550 in the fully locked state of the claw 500 and the striker 20.

That is, when a release signal is applied in the process in which the cinching operation is performed by the motor 100, the release protrusion 210 is rotated in the release operation direction so as to rotate the pawl lever 700 and the pawl 600 together.

Accordingly, the upper end of the pawl 600 presses one end of the interrupt lever 800, and thus the opposite end of the interrupt lever 800 is lifted upwards about the middle portion thereof and pushes up the cinching shaft 442, whereby the cinching shaft 442 is released from the latching protrusion 550 of the claw 500.

Therefore, the claw 500 is rotated by the elastic force of the claw spring 570 so as to be unlocked, and is released from the striker 20.

In addition, the present disclosure may further include an interrupt lever spring 810, which applies elastic force to the interrupt lever 800 such that one end of the interrupt lever 800 is rotated toward the pawl lever 700.

That is, after the claw 500 is released from the striker 20 by the operation of the interrupt lever 800 pushing the cinching shaft 442, the interrupt lever 800 is rotated to the original position thereof by the interrupt lever spring 810.

Figure 11A:
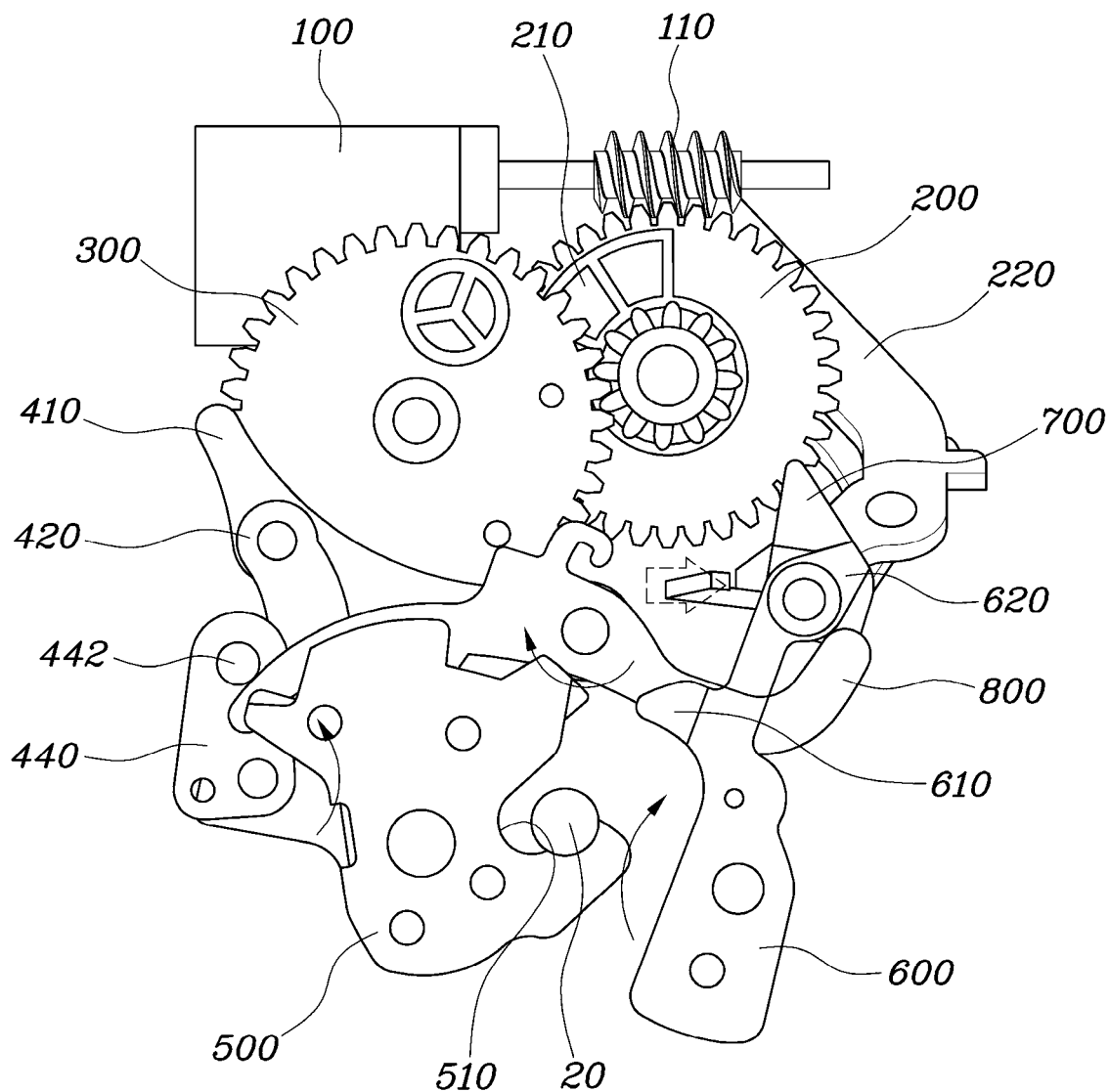
FIGS. 11A and 11B are views for explaining a process in which the release operation is performed by the emergency lever according to the present disclosure.
Figure 11B:
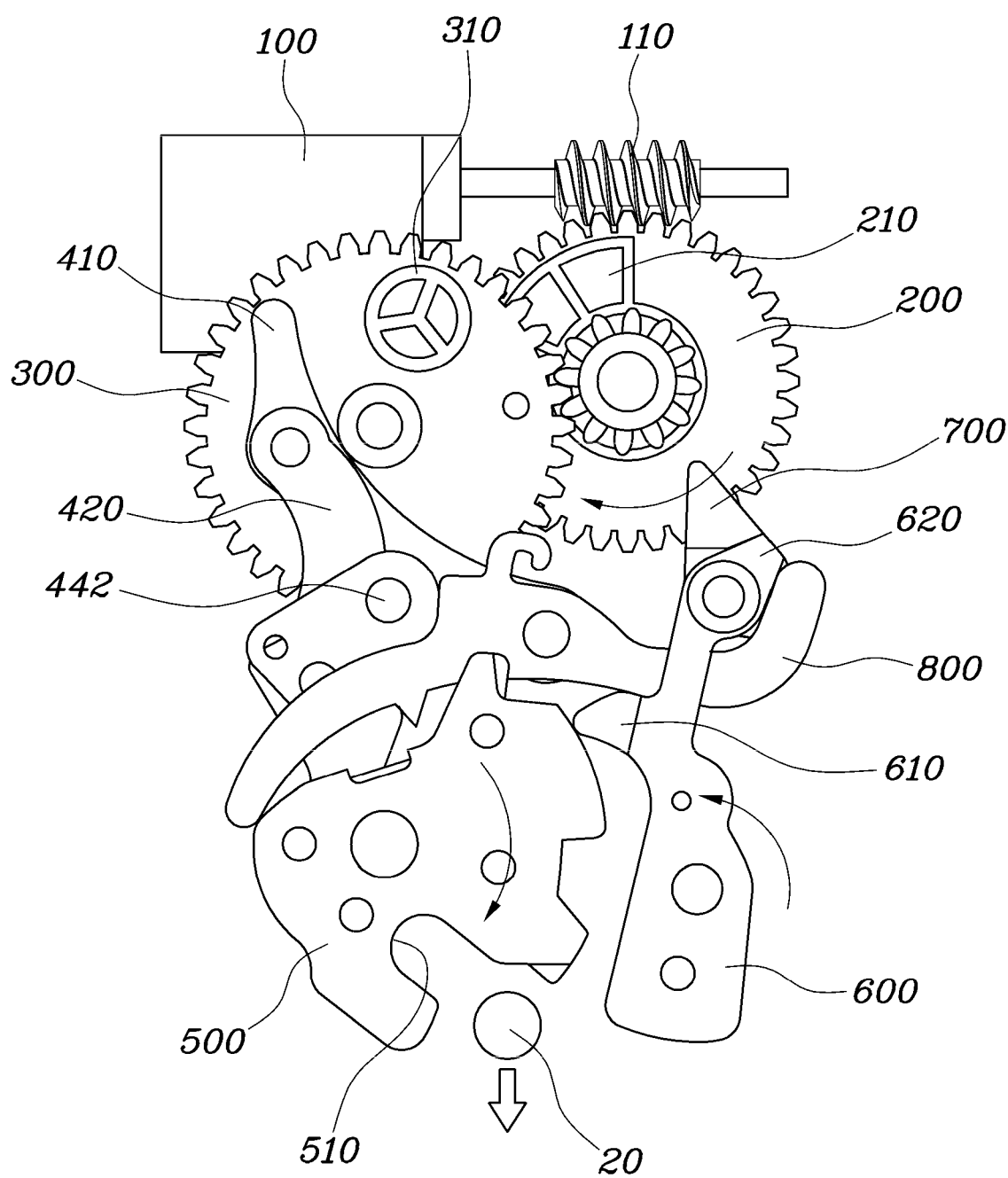

FIG. 10 is a view showing the configuration in which an emergency lever is coupled to the latch mechanism 10 according to the present disclosure, and FIGS. 11A and 11B are views for explaining a process in which the release operation is performed by the emergency lever according to the present disclosure.

Referring to the drawings, the present disclosure further includes an emergency lever 900, which is configured to be rotated about the middle portion thereof and which has one end located outside the latch mechanism 10 and an opposite end located inside the pawl lever 700 such that the opposite end rotates the pawl lever 700 in the release operation direction according to rotation of the one end.

That is, in the case of performing a release operation by manually operating the emergency lever 900 during the process in which the cinching operation is performed by the motor 100, the opposite end of the emergency lever 900 rotates the pawl lever 700 in the release operation direction, whereby the pawl 600 is rotated together with the pawl lever 700.

Accordingly, the upper end of the pawl 600 presses one end of the interrupt lever 800, and thus the opposite end of the interrupt lever 800 is lifted upwards about the middle portion of the interrupt lever 800 and pushes up the cinching shaft 442. Thereby, the cinching shaft 442 is released from the latching protrusion 550 of the claw 500.

As a result, the claw 500 is rotated by the elastic force of the claw spring 570 so as to be unlocked, and is released from the striker 20.

Power Cinching Operation

Hereinafter, the process of performing a power cinching operation using the motor 100 after changing from the unlocked state to the half-locked state will be described.

In the unlocked state of FIG. 4A, when the tailgate is moved downwards in the closed direction, the upper surface of the entrance of the hook recess 510 in the claw 500 is pressed by the striker 20 due to the weight of the tailgate.

Then, as shown in FIG. 4B, the claw 500 is rotated about the rotary shaft by the pressing force applied to the claw 500 by the striker 20. Accordingly, the striker 20 enters the hook recess 510, and the locking protrusion 610 is caught by the first restricting protrusion 540 and thus restricts rotation of the claw 500. Thereby, the striker 20 is half-locked to the hook recess 510.

In this half-locked state, as shown in FIG. 5A, the motor 100 is rotated so as to rotate the release protrusion 210 in the clockwise direction, whereby the cinching gear 300 is rotated in the counterclockwise direction.

Accordingly, the cinching protrusion 310 is also rotated and presses the crank lever 410 downwards, whereby the linkage mechanism 400 is rotated.

In particular, in the process in which the linkage mechanism 400 is rotated and moved downwards, the cinching lever 440 has a clockwise-directional torque due to the elastic force of the cinching spring 450, whereby the cinching shaft 442 coupled to the cinching lever 440 is caught and restricted by the latching protrusion 550 formed at the claw 500.

In this state, as shown in FIG. 5B, the cinching gear 300 rotates further and presses the crank lever 410, whereby the cinching shaft 442 rotates the claw 500 in the counterclockwise direction.

At this time, the release protrusion 210 formed at the release gear 200 pushes the pawl lever 700. However, because the release protrusion 210 is rotated in the clockwise direction, which is the release operation direction, the pawl 600 is not rotated, and only the pawl lever 700 is rotated.

When the cinching gear 300 rotates one time in the counterclockwise direction in the cinching operation, the claw 500 is rotated beyond the fully locked point, as shown in FIG. 5C. At this time, the pawl 600 is rotated by the elastic force of the pawl spring 630 so as to restrict the movement of the claw 500.

Subsequently, when the cinching protrusion 310 rotates further and does not press the crank lever 410 any longer, the linkage mechanism 400 and the claw 500 are rotated to the original positions thereof by the elastic force of the cinching spring 450 and the claw spring 570. At this time, the locking protrusion 610 formed at the pawl 600 is caught by the second restricting protrusion 560 of the claw 500, and thus the fully locked state is maintained, as shown in FIG. 7.

Upon detecting the fully locked state, the controller CRL stops the motor 100, thereby completing the power cinching operation.

Power Release Operation

Next, the process of performing a power release operation using the motor 100 in the fully locked state will be described.

When a release signal is applied in the fully locked state of FIG. 7, the motor 100 is rotated so as to rotate the release gear 200 in the counterclockwise direction, as shown in FIG. 8A.

Accordingly, the release protrusion 210 is rotated in the counterclockwise direction together with the release gear 200 and pushes the pawl lever 700. At this time, the pawl lever 700 is rotated about the rotary shaft together with the pawl 600 by the stopper 620.

Then, the locking protrusion 610 of the pawl 600 is released from the second restricting protrusion 560 of the claw 500, and the claw 500 is released.

Accordingly, the claw 500 is rotated in the clockwise direction, which is the unlocking direction, by the elastic force of the claw spring 570, and the striker 20 is released from the claw 500. As a result, the striker 20 is unlocked from the claw 500.

At this time, upon detecting the unlocked state, the controller CRL stops the motor 100 and maintains the state in which the release protrusion 210 pushes the pawl lever 700 for a predetermined period of time.

The reason for this is to prevent the claw 500 from being locked to the striker 20 again if the tailgate sags due to the weight thereof.

Subsequently, after a predetermined period of time during which the tailgate is capable of being moved to the open position elapses, as shown in FIG. 8B, the motor 100 is operated to rotate the release gear 200 to the original position thereof in the clockwise direction. Thereby, the release protrusion 210 is separated from the pawl lever 700, and the pawl 600 is rotated by the pawl spring 630 so as to return to the claw 500.

At this time, upon detecting the return of the pawl 600, the controller CRL stops the motor 100, thereby completing the release operation.

Power Interrupt Release Operation

Next, the operation that is performed when a release signal is applied to the controller CRL during the power cinching operation using the motor 100 will be described.

When a release signal is detected during the power cinching operation shown in FIG. 5C, the motor 100 is operated in reverse so as to rotate the release gear 200 in the counterclockwise direction, as shown in FIG. 9A.

Accordingly, the release protrusion 210 is rotated in the counterclockwise direction together with the release gear 200 and pushes the pawl lever 700. At this time, the pawl lever 700 is rotated about the rotary shaft together with the pawl 600 by the stopper 620. In particular, the pawl 600, which is rotated together with the pawl lever 700, pushes the interrupt lever 800 to rotate the same.

Then, the opposite end of the interrupt lever 800 is rotated so as to lift up the cinching shaft 442. Thereby, the cinching shaft 442 is released from the latching protrusion 550, and thus the claw 500 is released.

Accordingly, the claw 500 is rotated in the clockwise direction, which is the unlocking direction, by the elastic force of the claw spring 570, and the striker 20 is released from the claw 500. As a result, the striker 20 is unlocked from the claw 500.

At this time, upon detecting the unlocked state, the controller CRL stops the motor 100 and maintains the state in which the release protrusion 210 pushes the pawl lever 700 for a predetermined period of time.

The reason for this is to prevent the claw 500 from being locked to the striker 20 again if the tailgate sags due to the weight thereof.

Subsequently, after a predetermined period of time during which the tailgate is capable of being moved to the open position elapses, as shown in FIG. 9B, the motor 100 is operated to rotate the release gear 200 to the original position thereof in the clockwise direction. Thereby, the release protrusion 210 is separated from the pawl lever 700, and the pawl 600 is rotated by the pawl spring 630 so as to return to the claw 500.

At this time, upon detecting the return of the pawl 600, the controller CRL stops the motor 100, thereby completing the release operation.

Manual Interrupt Release Operation

Next, the process of performing a manual release operation using the emergency lever 900 during the power cinching operation using the motor 100 will be described.

When the emergency lever 900 is operated during the power cinching operation shown in FIG. 5C, one end of the emergency lever 900 directly rotates the pawl lever 700 in the counterclockwise direction, as shown in FIG. 11A.

At this time, the pawl lever 700 is rotated about the rotary shaft together with the pawl 600 by the stopper 620. In particular, the pawl 600, which is rotated together with the pawl lever 700, pushes the interrupt lever 800 to rotate the same.

Then, the opposite end of the interrupt lever 800 is rotated so as to lift up the cinching shaft 442. Thereby, the cinching shaft 442 is released from the latching protrusion 550, and thus the claw 500 is released.

Accordingly, the claw 500 is rotated in the clockwise direction, which is the unlocking direction, by the elastic force of the claw spring 570, and the striker 20 is released from the claw 500. As a result, the striker 20 is unlocked from the claw 500, and the release operation is completed.

As is apparent from the above description, according to the present disclosure, it is possible to perform a cinching operation and a release operation using a single motor, rather than separately mounting a motor for a cinching operation and a motor for a release operation, thereby reducing the number of components, thus reducing the manufacturing cost and the weight of the device and improving the operability of the device. As a result, it is possible to reduce the defect rate of the device and thus to reduce field claim.

Although exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. A device for opening and closing a tailgate, the device comprising:
    a release gear configured to be rotated forward and backward by a motor in order to perform a cinching operation and a release operation;
    a cinching gear engaged with the release gear, the cinching gear being configured to rotate;
    a linkage mechanism configured to receive force from the cinching gear to rotate toward a claw when the cinching gear rotates during the cinching operation;
    wherein the claw is caught by the linkage mechanism rotating during the cinching operation to rotate together therewith to engage with a striker;
    a pawl unit including a pawl disposed opposite the claw and configured to rotate about a rotary shaft of the pawl, wherein the pawl unit is configured to be caught by the claw when the claw is engaged with the striker to restrict rotation of the claw in a release operation direction, and wherein the pawl unit is configured to rotate together with the release gear only when the release gear rotates during the release operation to allow rotation of the claw in the release operation direction; and
    an interrupt lever comprising one end pressed by the pawl during the release operation, the interrupt lever being configured to rotate about a middle portion thereof such that an opposite end thereof pushes up a cinching shaft so as to release the cinching shaft from a latching protrusion of the claw.

2. The device of claim 1, wherein a hook recess is formed in an outer surface of the claw that faces the striker, and
    wherein, when the striker is introduced into the hook recess, the claw is rotated about a rotary shaft thereof such that the claw is in a half-locked position.

3. The device of claim 2, further comprising:
    a half-lock detection sensor configured to detect the half-locked position of the claw; and
    a controller configured to control the motor to rotate a shaft of the motor in a cinching operation direction when the half-locked position is detected.

4. The device of claim 3, wherein a half-lock detection protrusion is formed on the claw near a circumference of the rotary shaft of the claw, and
    wherein the half-lock detection sensor detects the half-locked position depending on whether the half-lock detection protrusion is detected.

5. The device of claim 1, wherein a cinching protrusion is formed on a portion of the cinching gear in a circumferential direction of the cinching gear, and
    wherein a portion of the linkage mechanism is located in a rotation path of the cinching protrusion such that the cinching protrusion applies a pressing force to the linkage mechanism when the cinching gear rotates during the cinching operation.

6. The device of claim 5, wherein the linkage mechanism comprises:
    a crank lever comprising one end to which a first fixed hinge shaft is coupled and an opposite end to which a first rotary hinge shaft is coupled;
    a coupler lever comprising one end coupled to the first rotary hinge shaft and an opposite end to which a second rotary hinge shaft is coupled; and
    a follower lever comprising one end to which a second fixed hinge shaft is coupled and an opposite end coupled to the second rotary hinge shaft;
    wherein, when an outer surface of the crank lever is pressed by the cinching protrusion, the levers are rotated such that the first rotary hinge shaft and the second rotary hinge shaft are rotated about the first fixed hinge shaft and the second fixed hinge shaft, respectively.

7. The device of claim 6, the linkage mechanism further comprising:
    a cinching lever comprising one end coupled to the second rotary hinge shaft and an opposite end to which a cinching shaft is secured; and
    a cinching spring configured to apply elastic force to the cinching lever such that the cinching shaft rotates toward the claw about the second rotary hinge shaft;
    wherein a latching protrusion is formed on a portion of an outer surface of the claw; and
    wherein, when the cinching lever rotates toward the claw during the cinching operation, the cinching shaft is caught by the latching protrusion, and the claw is rotated to engage with the striker.

8. The device of claim 6, wherein a release protrusion is formed on a portion of the release gear in a circumferential direction of the release gear, and
    wherein the pawl unit further comprises:
    a pawl lever comprising one end located in a rotation path of the release protrusion to interfere with the release protrusion, and an opposite end disposed at an end portion of the pawl to be rotated alone when the release gear is rotated in a cinching operation direction during the cinching operation, and to be rotated together with the pawl when the release gear is rotated in the release operation direction.

9. The device of claim 8, wherein a stopper is formed between the pawl and the pawl lever, and
    wherein the stopper is located in a rotation path of the pawl lever rotating together with the pawl.

10. The device of claim 8, further comprising:
    a full-lock detection sensor configured to detect a fully locked position of the claw when the claw is fully locked to the striker by the cinching operation; and
    a controller configured to control the motor to stop operating when the fully locked position of the claw is detected by the full-lock detection sensor.

11. The device of claim 10, wherein a full-lock detection protrusion is formed on a circumference of a rotary shaft of the cinching gear; and
    wherein the full-lock detection sensor detects the full locked position depending on whether the full-lock detection protrusion is detected.

12. The device of claim 11, wherein a pinion is secured to a rotary shaft of the release gear,
    wherein the pinion is externally engaged with the cinching gear at a predetermined reduction gear ratio; and
    wherein, when the motor rotates the release gear in the cinching operation direction and the full-lock detection protrusion rotating, according to the predetermined reduction gear ratio, is detected by the full-lock detection sensor, the device is in a fully locked state.

13. The device of claim 8, further comprising:
    an unlock detection sensor configured to detect an unlocked position of the pawl when the pawl lever and the pawl are rotated together by the release protrusion according to the release operation and the claw is released from the striker,
    wherein the controller controls the motor to stop operating when the unlocked position is detected by the lock detection sensor.

14. The device of claim 13, wherein an unlock detection protrusion is formed on the pawl near a circumference of the rotary shaft of the pawl; and wherein the unlock detection sensor detects the unlocked position depending on whether the unlock detection protrusion is detected.

15. The device of claim 13, wherein the controller stops the motor when the unlocked position of the pawl is detected, and wherein the controller controls the motor to return to a state prior to the release operation when a predetermined period of time elapses after the motor is stopped.

16. The device of claim 8, wherein, when the release gear is rotated in the release operation direction, the release protrusion pushes the pawl lever and the pawl together such that the one end of the interrupt lever is pressed.

17. The device of claim 8, further comprising:

an emergency lever configured to be rotated about a middle portion thereof, the emergency lever comprising one end located outside a housing of the device and an opposite end located inside the pawl lever such that the opposite end rotates the pawl lever in the release operation direction according to rotation of the one end.

* * * * *